May 1, 1962
E. A. DAVIS ET AL
3,032,263
CALCULATING MACHINE
Filed June 29, 1959
15 Sheets-Sheet 6
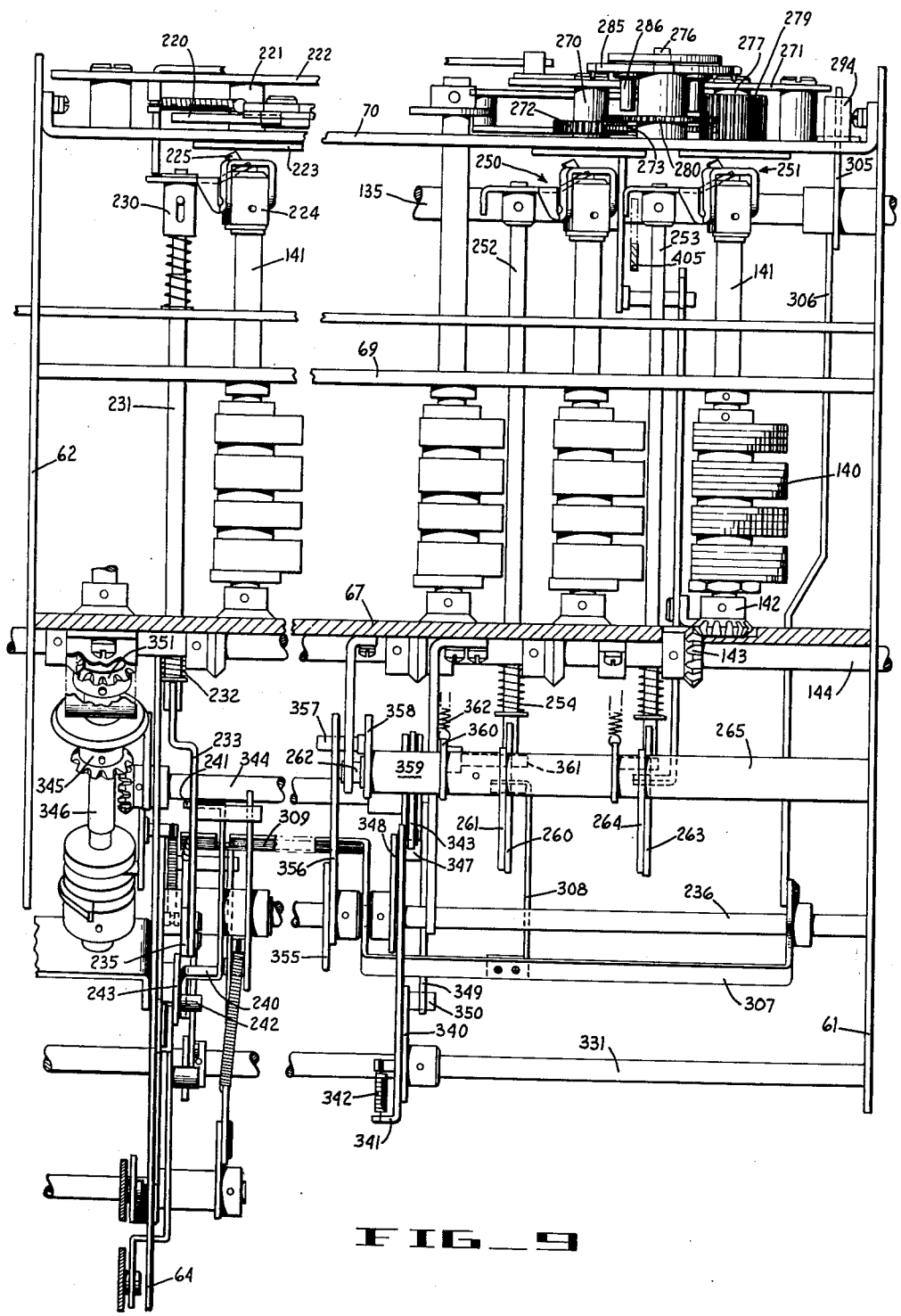
FIG_9

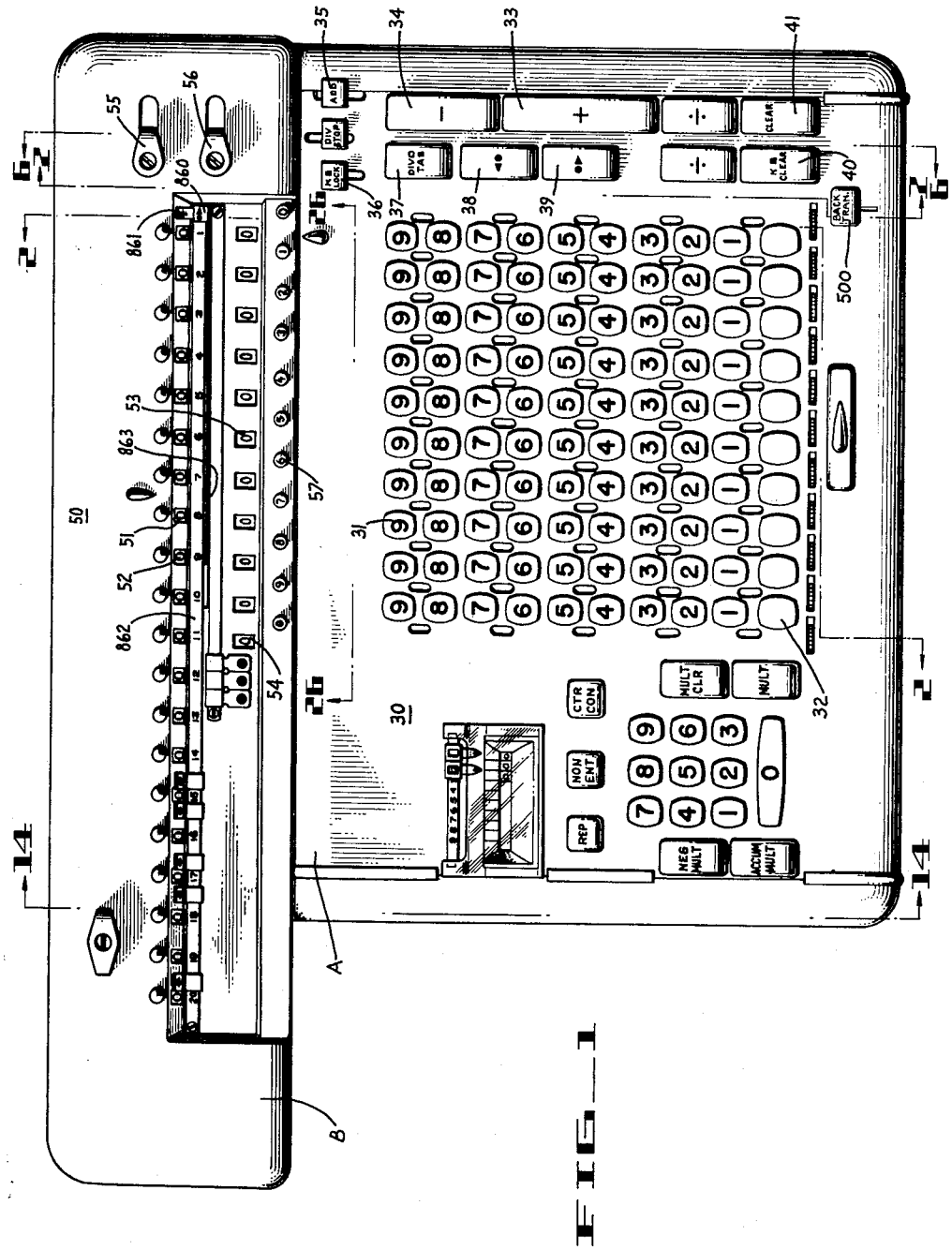

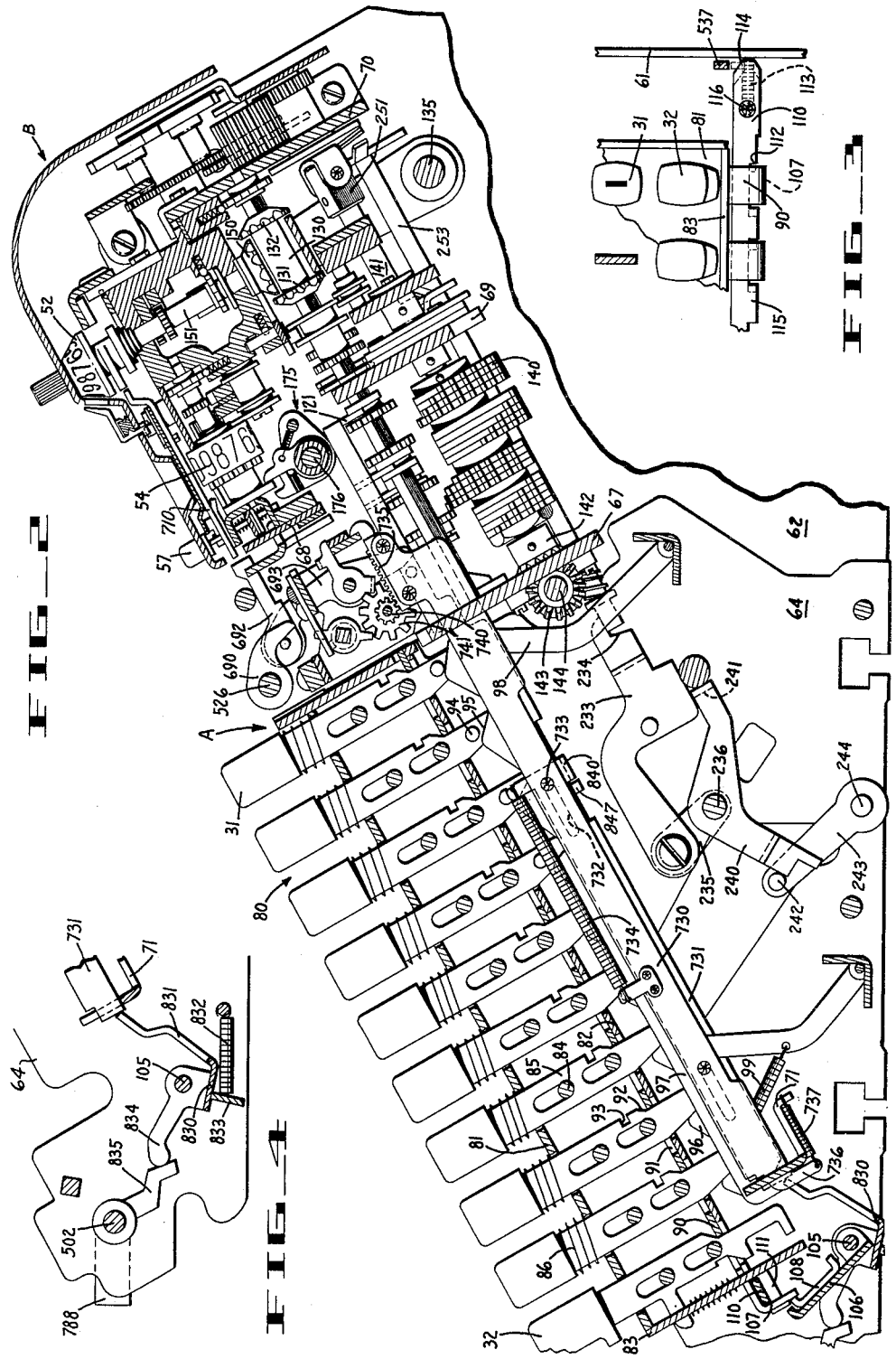

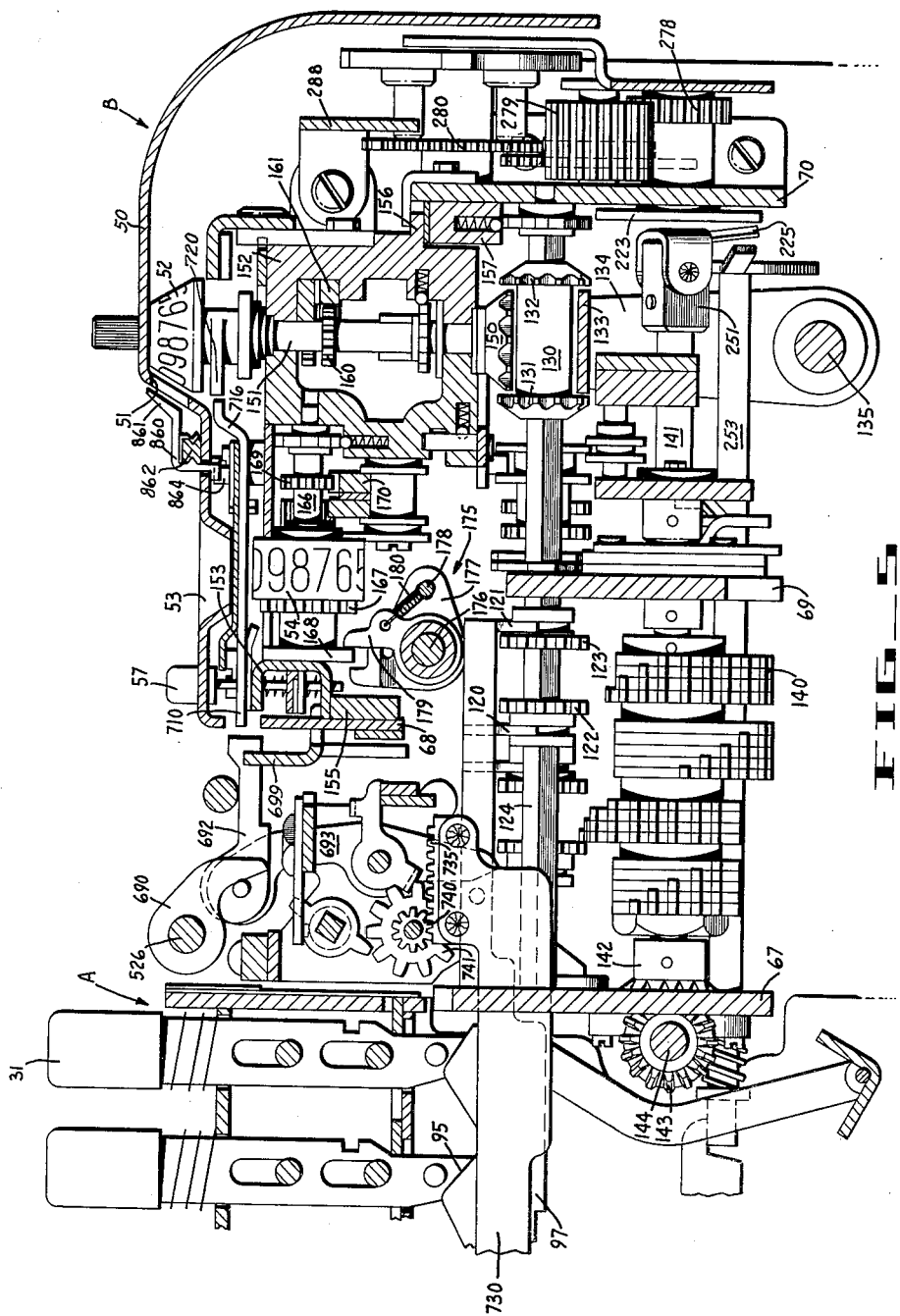

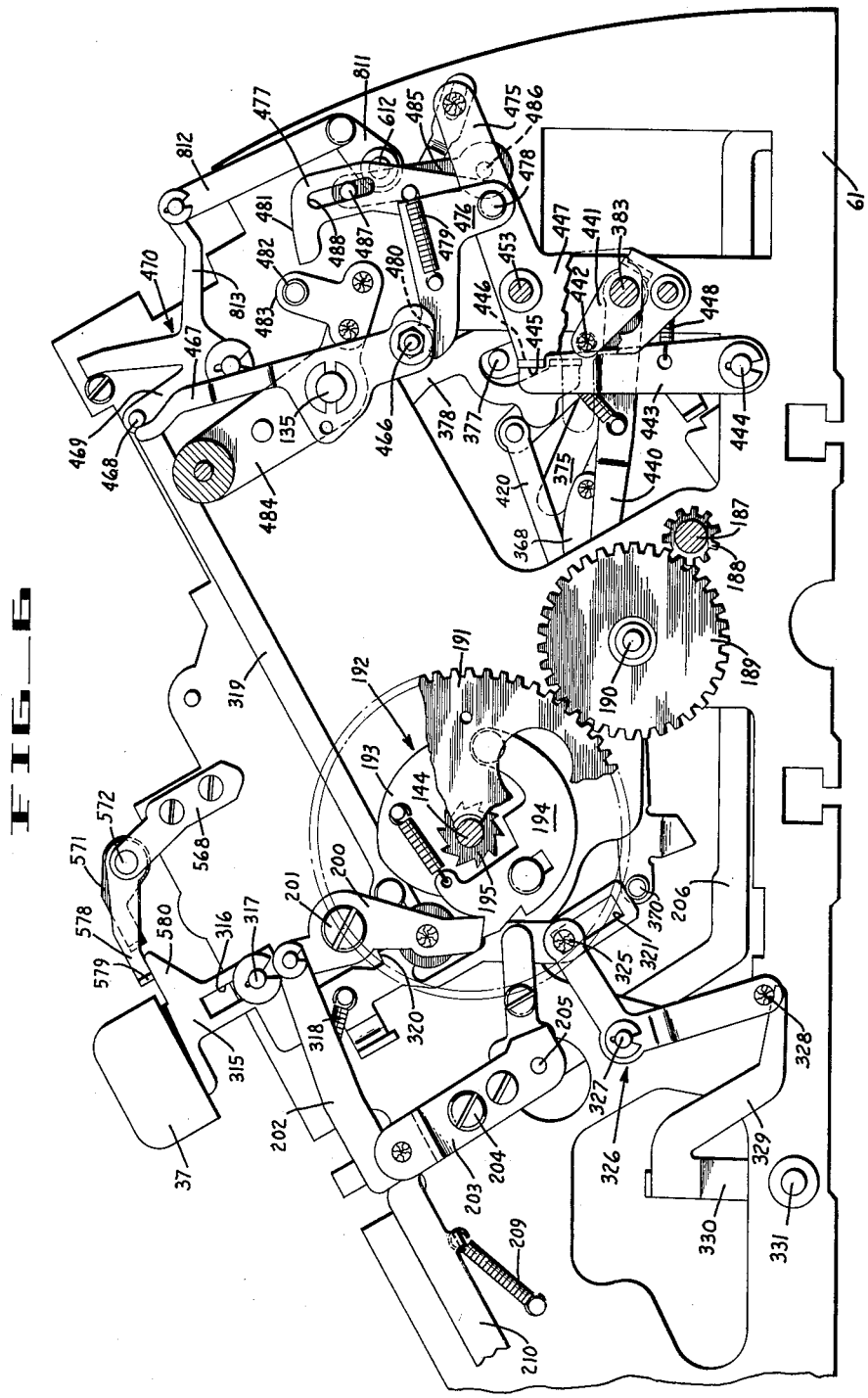

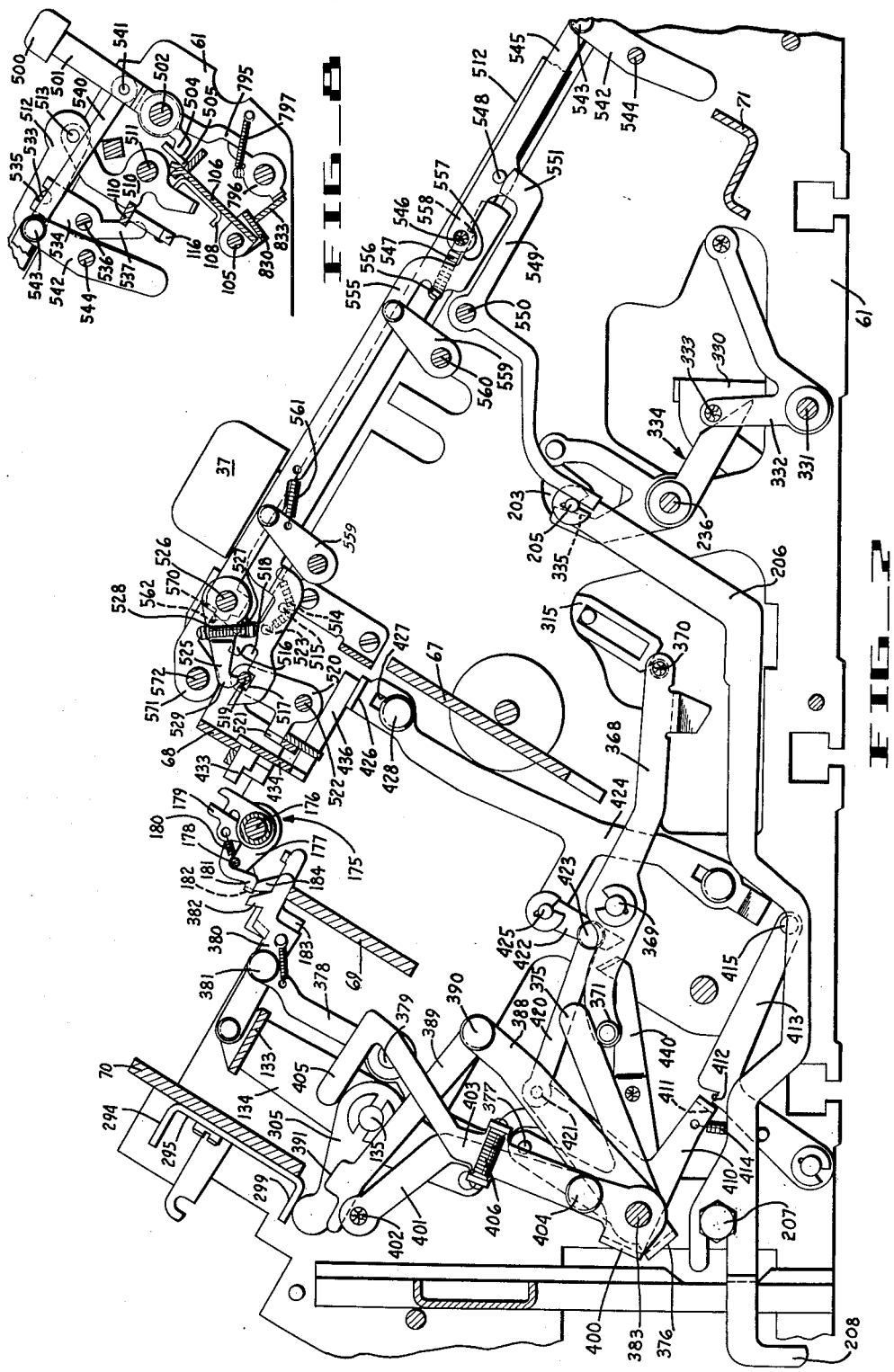

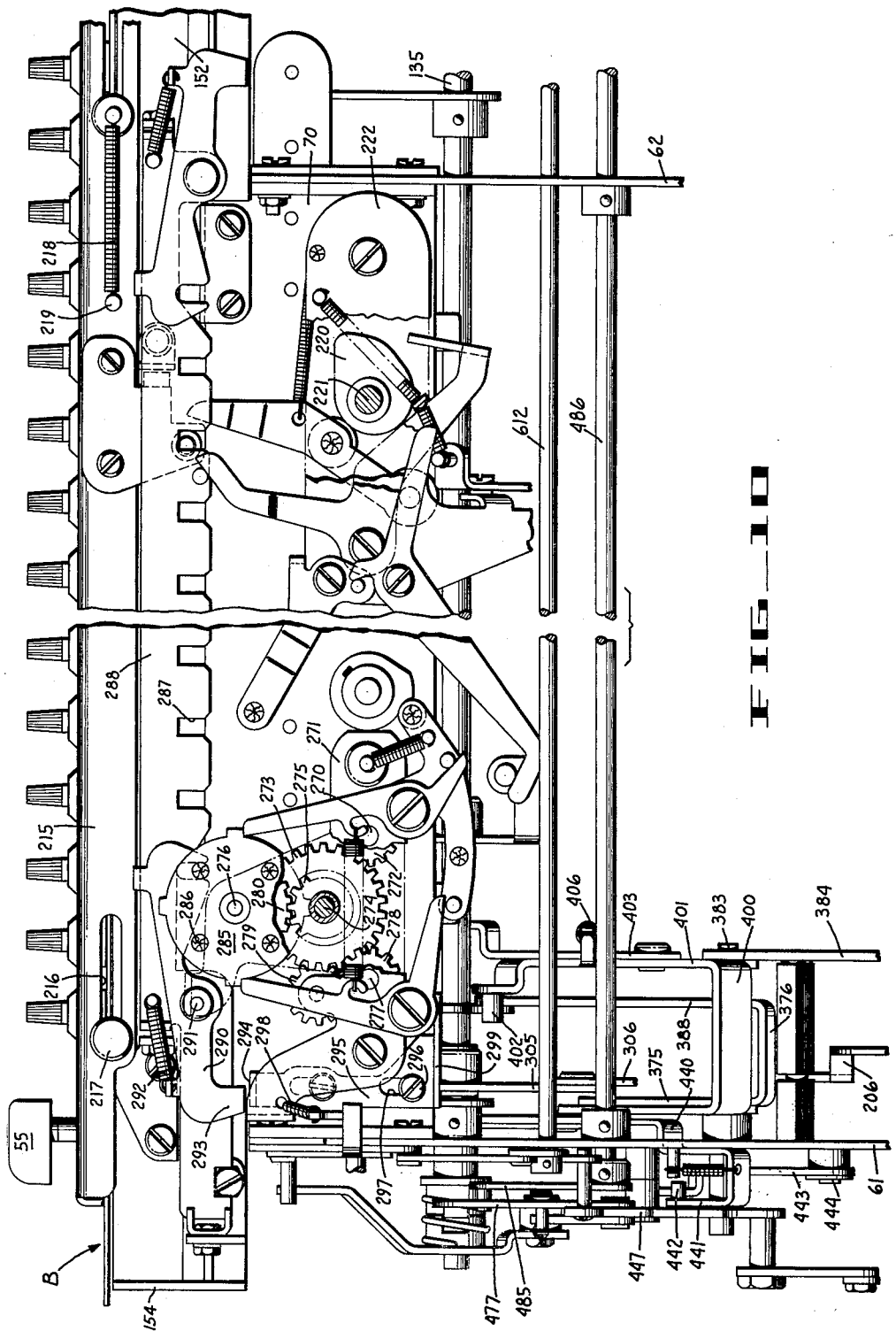

May 1, 1962
E. A. DAVIS ET AL
3,032,263
CALCULATING MACHINE
Filed June 29, 1959
15 Sheets-Sheet 8
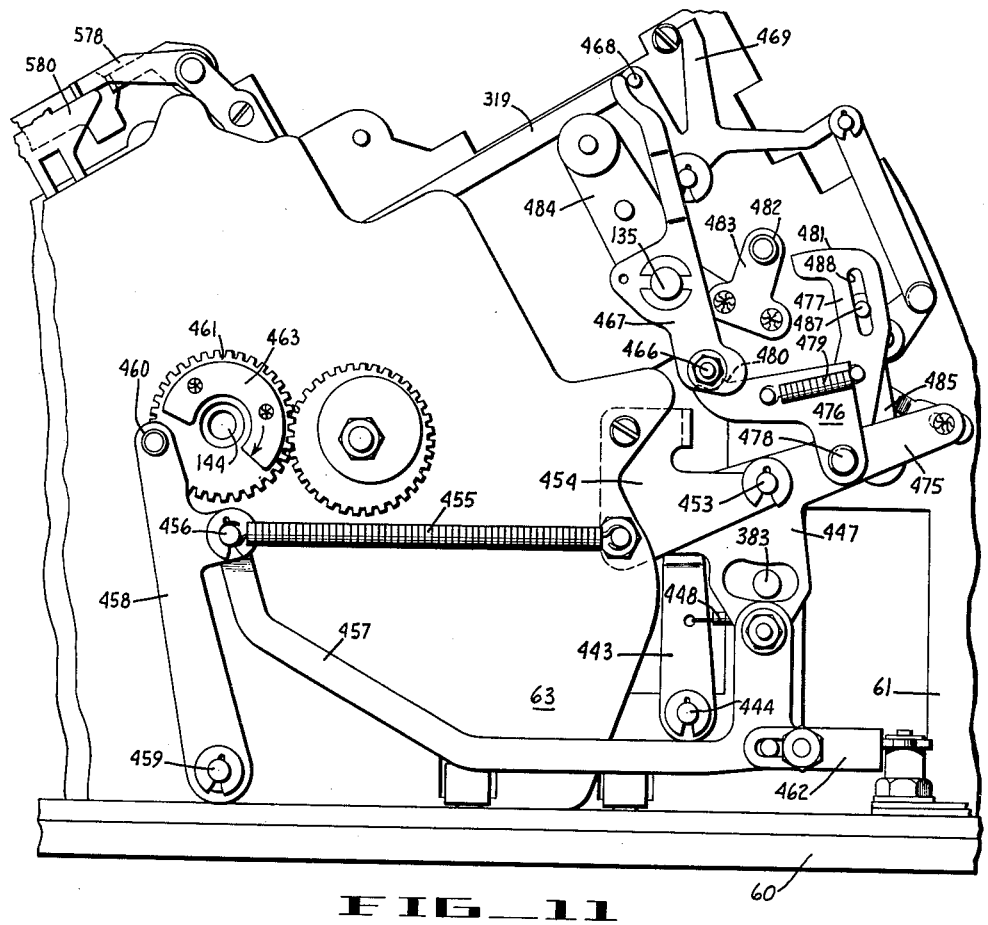
FIG_11
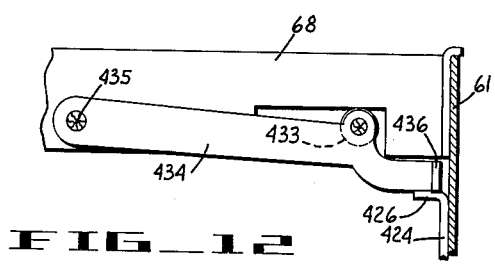
FIG_12
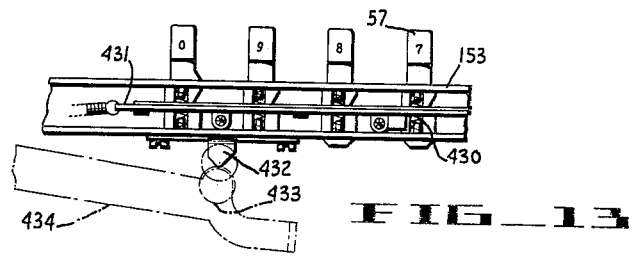
FIG_13

May 1, 1962
E. A. DAVIS ET AL
3,032,263
CALCULATING MACHINE
Filed June 29, 1959
15 Sheets-Sheet 9
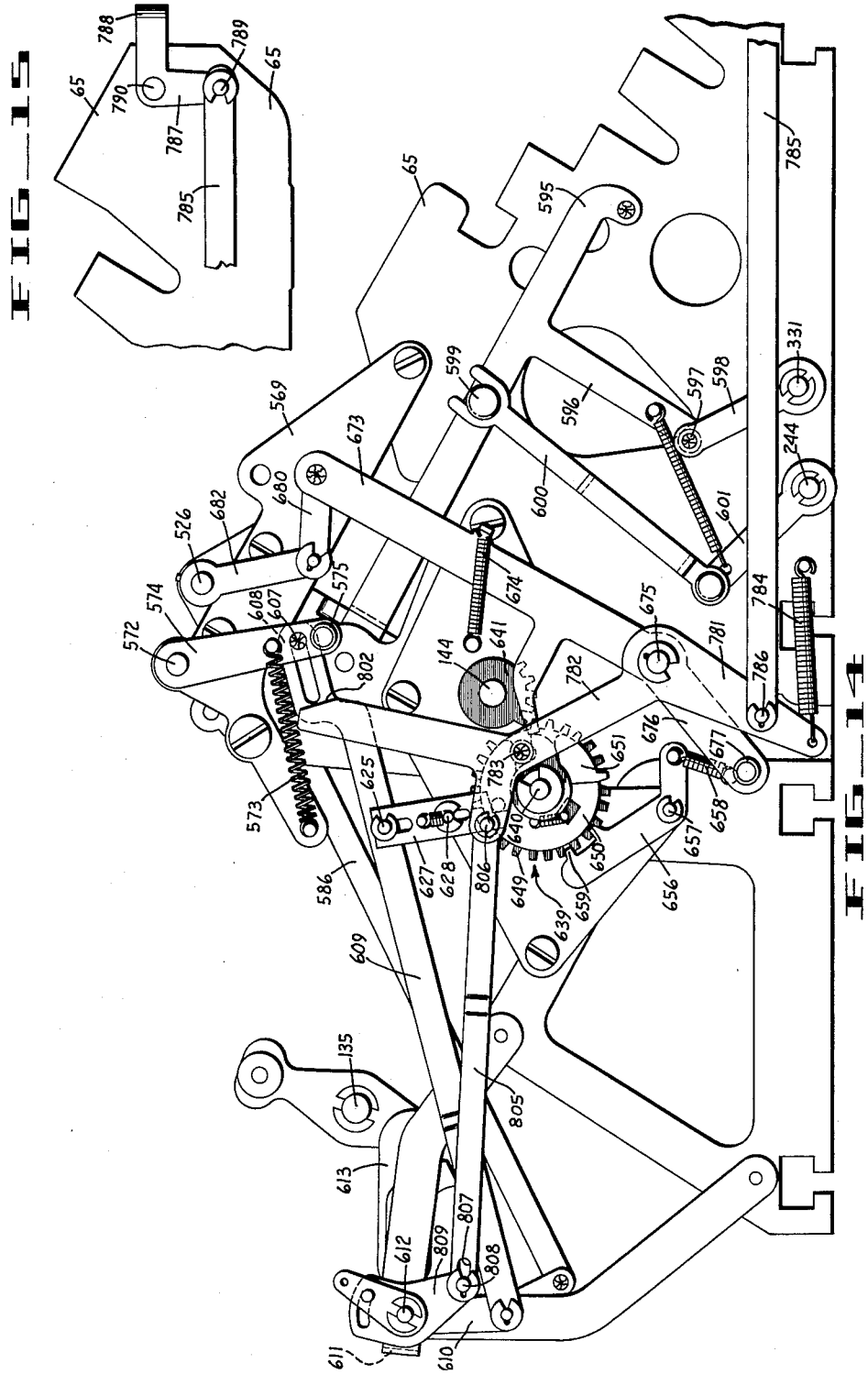

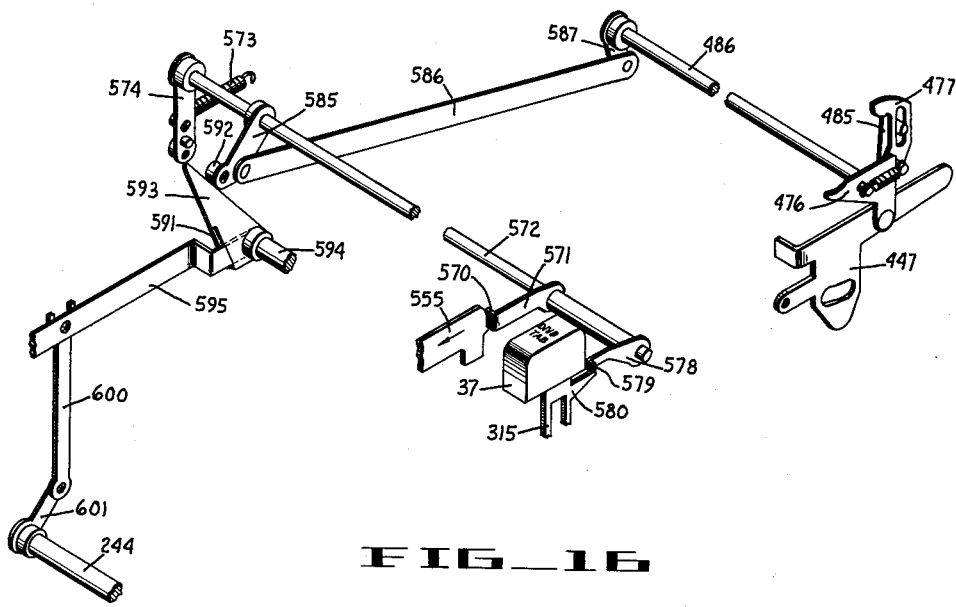
FIG_16
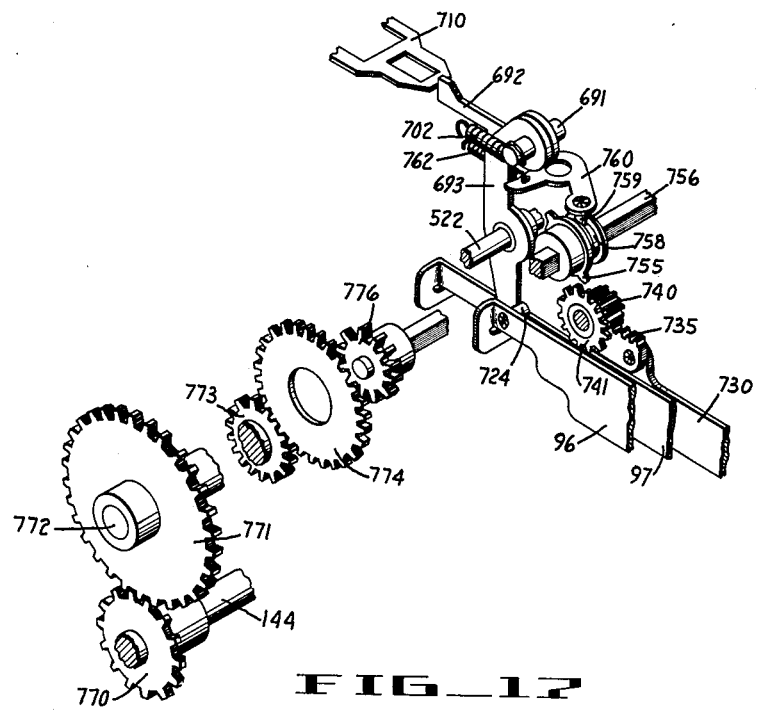
FIG_17

May 1, 1962  E. A. DAVIS ET AL  3,032,263
CALCULATING MACHINE
Filed June 29, 1959  15 Sheets-Sheet 11
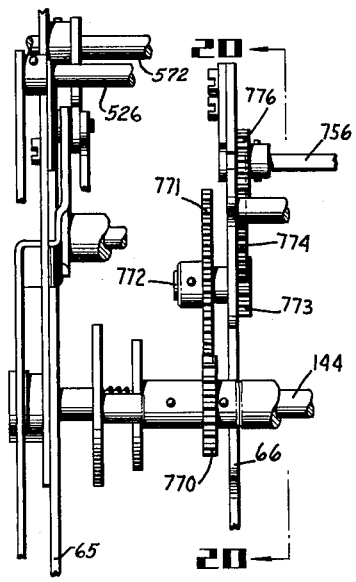
FIG_19
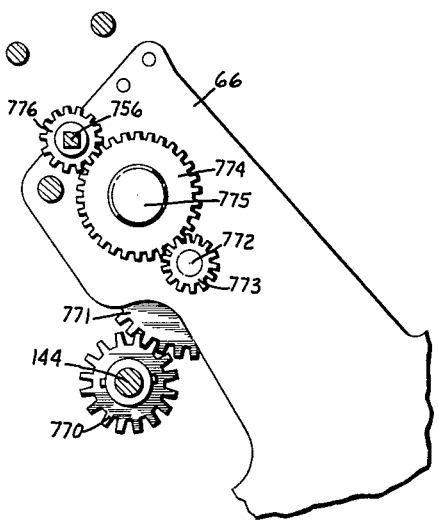
FIG_20
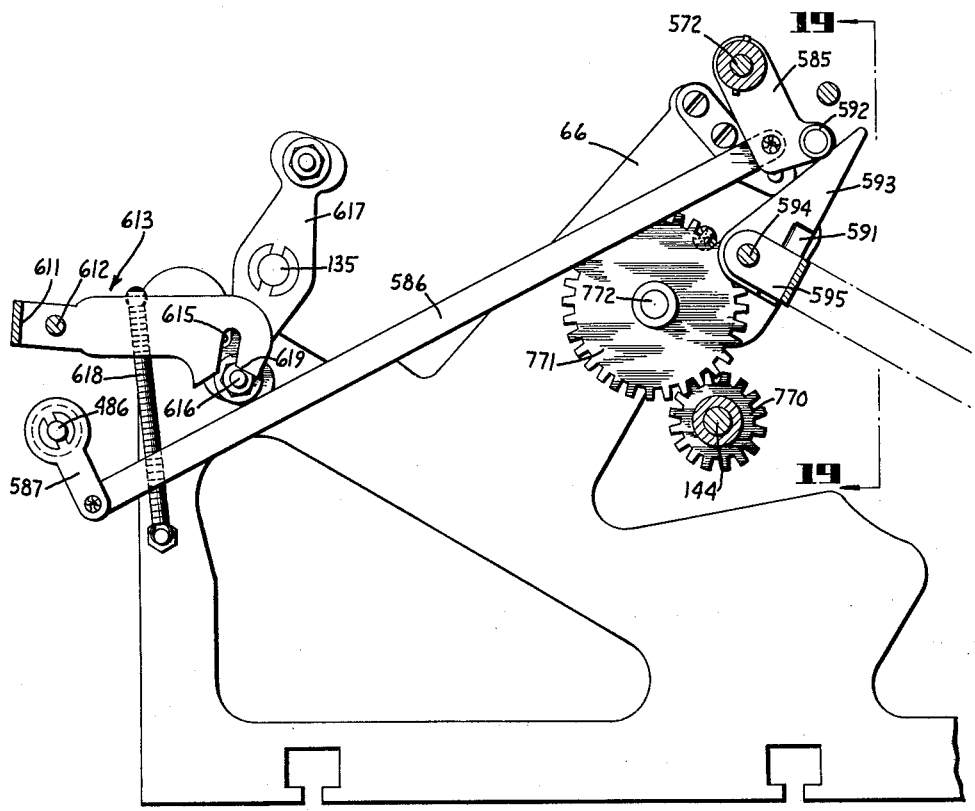
FIG_18

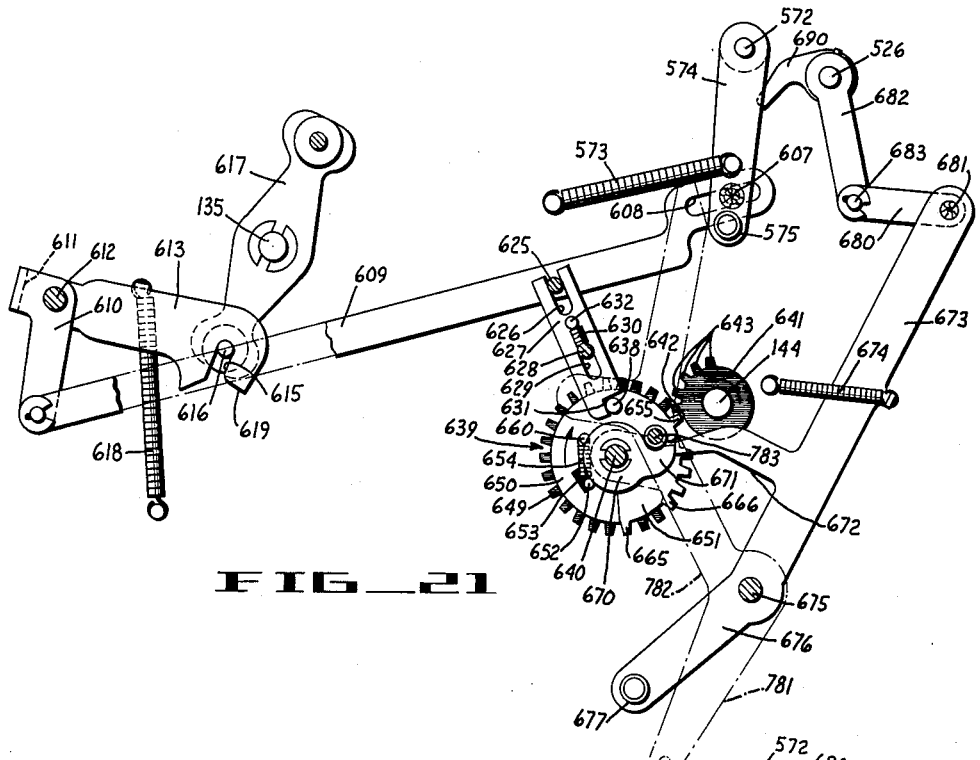
FIG_21
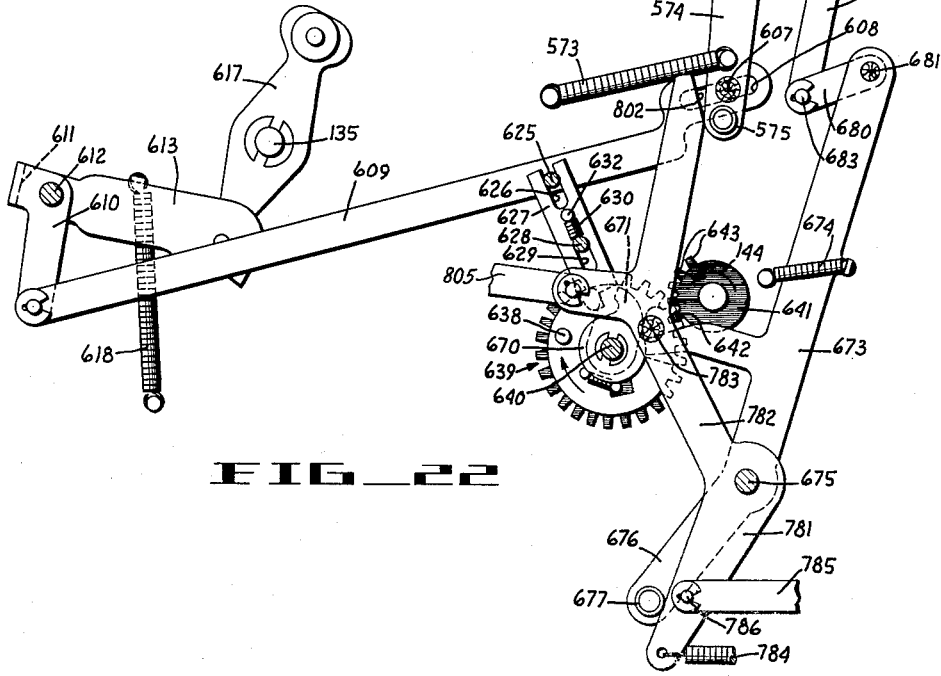
FIG_22

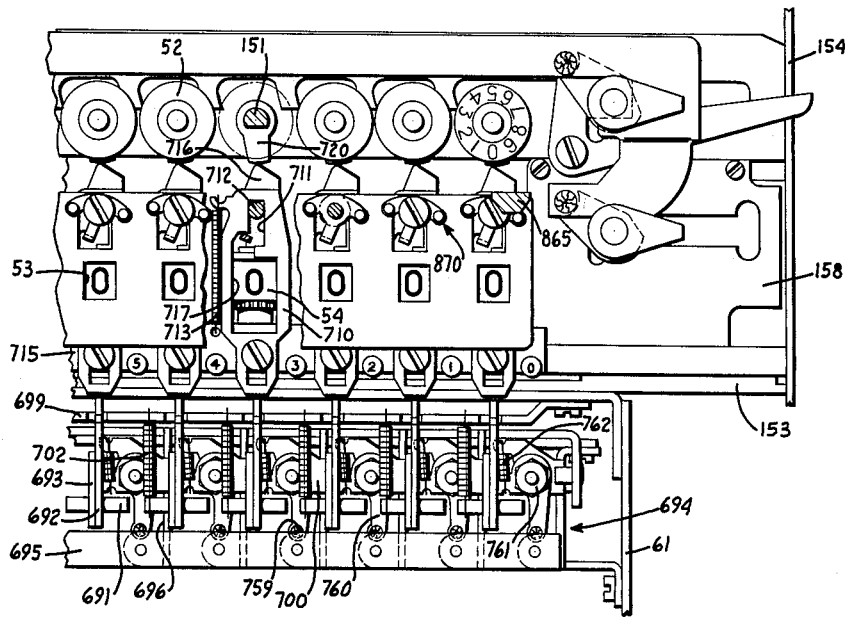
FIG_23
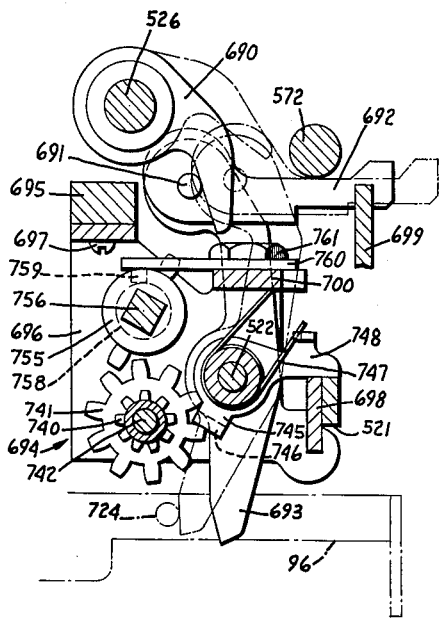
FIG_24
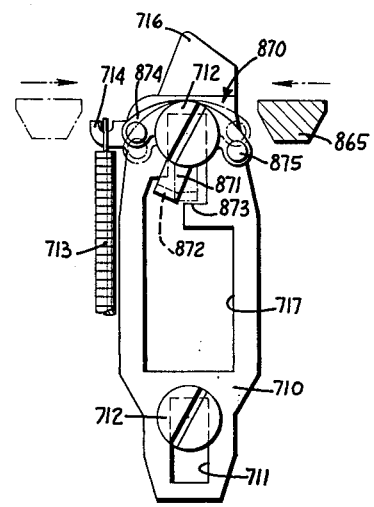
FIG_25

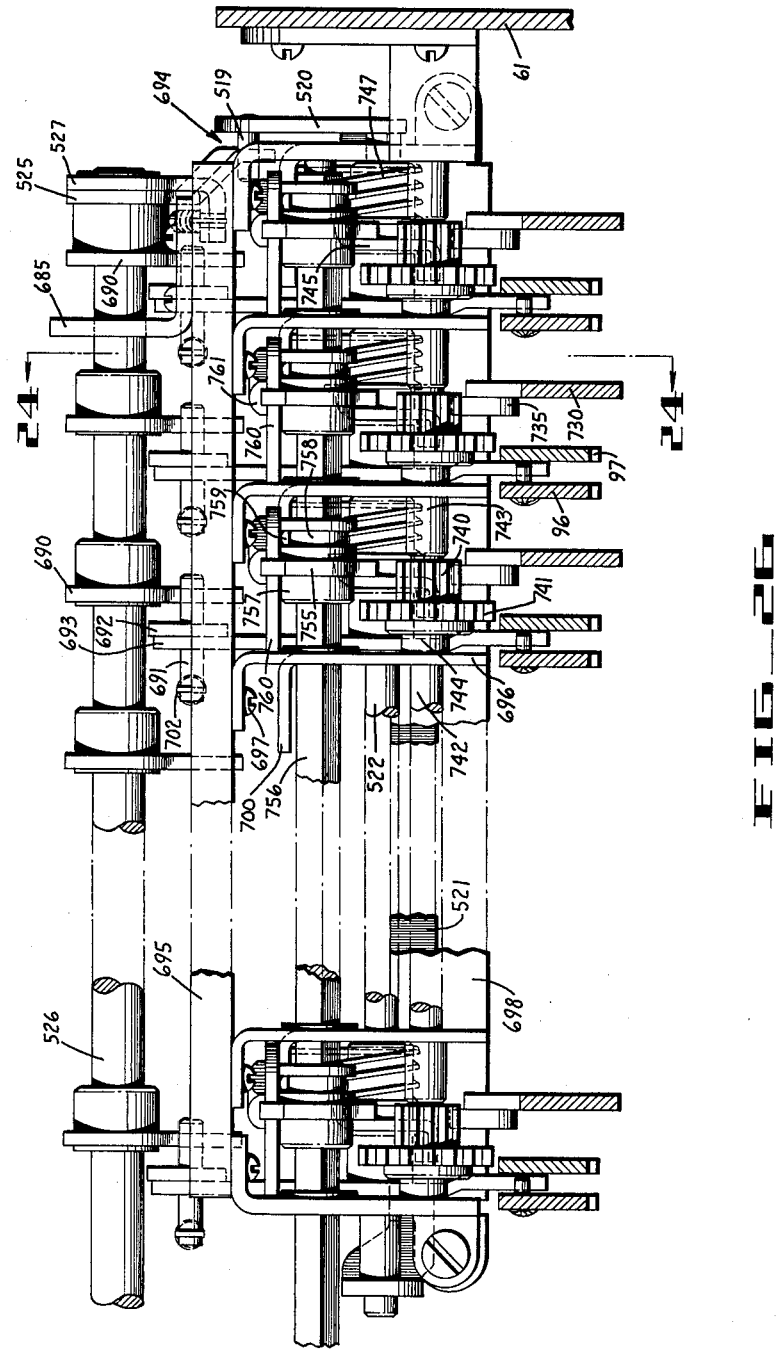

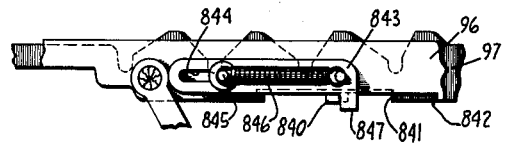
FIG_28
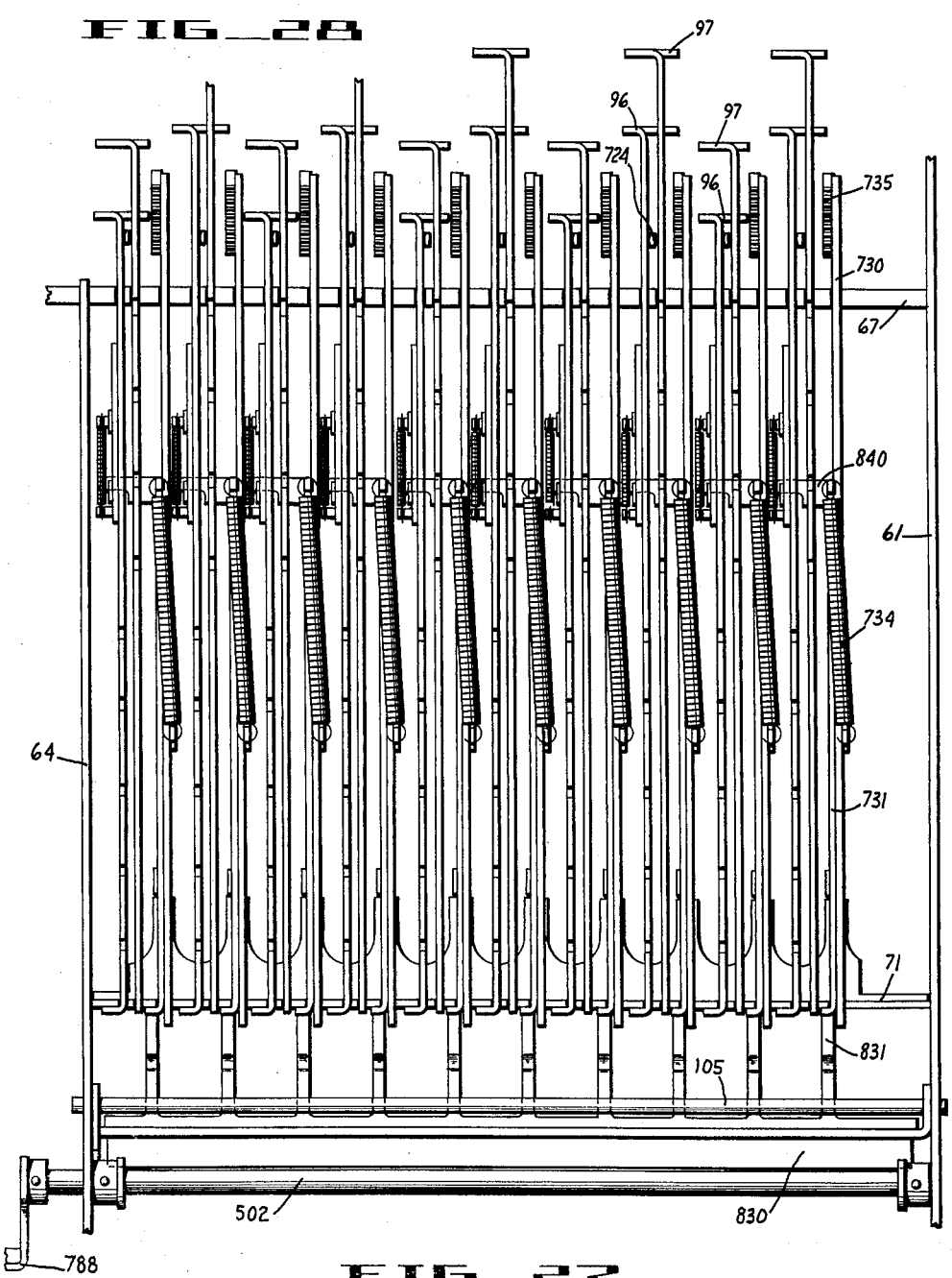
FIG_27

United States Patent Office 3,032,263
Patented May 1, 1962

3,032,263
CALCULATING MACHINE
Elwood A. Davis, Castro Valley, and Gilman Plunkett, San Leandro, Calif., assignors to Friden, Inc., a corporation of California
Filed June 29, 1959, Ser. No. 823,687
6 Claims. (Cl. 235—73)

TABLE OF CONTENTS

| | Column |
|---|---|
| I. Conventional Mechanisms: | 4 |
|    A. General Arrangement | 4 |
|    B. Keyboard | 5 |
|    C. Selection Mechanism | 7 |
|    D. Actuating Mechanism | 8 |
|    E. Accumulator Register | 8 |
|    F. Counter Register | 9 |
|    G. Drive Mechanism and Clutch | 10 |
|    H. Register Clearing | 11 |
|    I. Carriage Shift | 13 |
|    J. Automatic Carriage Shift | 14 |
| II. Back-Transfer Mechanism: | 21 |
|    (1) Back Transfer Control Key and Mechanism | 22 |
|    (2) Preliminary Conditioning Mechanisms | 25 |
|       (I) Operate Tabulating Mechanism | 25 |
|       (II) Condition Digitation Control Gate for Subtraction | 26 |
|       (III) Disable Clear Clutch | 26 |
|       (IV) Condition Back Transfer Program Mechanism for Operation | 27 |
|    (3) Programming or Counting Mechanism | 28 |
|    (4) Value Sensing Mechanism | 31 |
|    (5) Back Transfer Auxiliary Members | 33 |
|    (6) Incremental Adjustment of Auxiliary Slides | 35 |
|    (7) Setting Transferred Values Into Selection Mechanism | 38 |
|    (8) Restoring Back-Transfer Mechanism to Inoperative Position | 39 |
|    (9) Disabling Back Transfer From Preselected Orders | 39 |
| III. Résumé | 41 |

This invention relates to a calculating machine, and particularly to a mechanism therefor which is operative to set a value standing in an accumulator register into the selection mechanism so that it may be used as a factor in subsequent operations.

It is one primary object of the present invention to provide what is often called a "back-transfer" mechanism for a calculating machine, i.e., a mechanism which can be selectively operated to transmit a value accumulated in the accumulator register back into the selection mechanism, from whence it can be used as a factor in a number of subsequent problems.

In its preferred form, our invention utilizes a Thomas-type calculating machine of the type disclosed in the patent to Friden, No. 2,229,889 issued January 28, 1941, as modified by certain patents mentioned hereafter, and provides for that machine a relatively simple mechanism (utilizing, for the most part, conventional parts of that commercial machine) to enable the back transfer of a value from the accumulator, or product register, back into the selection mechanism where it will be held until manually released by the machine operator.

Another important object of the present invention is to provide, in a machine of the type mentioned, a means for driving a back-transfer mechanism more efficiently and with less strain on conventional mechanisms than has heretofore been the case. It can be mentioned that back-transfer mechanisms heretofore constructed are usually operated by clearing the particular register to "0" through the conventional clearing, or zeroizing, mechanism while the register dials are connected through intermediate gearing to a selection setting device. It will be understood that, in most instances, the clearing mechanism of a particular machine will have been designed to clear the respective dials of a register but have not been designed to operate heavier mechanisms, such as the gearing, shafts and auxiliary devices. Such back-transfer mechanisms are, relatively speaking, rather large and involve parts of considerable weight, so that the setting of such mechanisms through the conventional clearing devices, through inertia alone, throws a very heavy load on the conventional clearing mechanism and in occasional instances such a heavy load that the clearing mechanism might fail. In the particular machine used to illustrate the present invention, this problem is rendered even more complicated because the conventional Geneva mechanisms are designed to block rotation of the accumulator driving gear shaft at the end of the digitation, or value entry, phase of a cycle; thereafter permit a tens-transfer to be accomplished; and again block the rotation of the accumulator drive gear mechanism. Obviously these Geneva mechanisms must be accurately timed and any practical back-transfer mechanism must be so designed as to not interfere with the conventional functioning and timing of such mechanisms. In this respect, in the preferred form of our invention, we utilize a conventional selection and digitation mechanism to effect the back transfer, and for this purpose we provide a means for setting the respective ordinal selection mechanisms to a value of "1"; operating the actuating mechanism subtractively until the various accumulator dials return to "0"; and, simultaneously with each cycle of operation, incrementally feeding an auxiliary selection device incrementally from "0" to the various values until the coordinal dial is returned to its "0" position. Such a procedure involves operating the machine through a program of nine cycles in order to back transfer a value of "9" to its respective auxiliary selection mechanism—it being understood that during this program of nine cycles the various ordinal back-transfer mechanisms will be disabled as the coordinal accumulator dial returned to its "0" position.

It is, therefore, an important object of the present invention to provide a back-transfer mechanism by means of which the transfer is accomplished through the operation of the conventional selection and actuating mechanisms, thereby using conventional parts in a conventional manner, and affording a mechanism of the type described which does not require modification of existing clearing mechanisms. It should be noted that it is contemplated that these features will be associated with an automatic tabulating mechanism, i.e., one operative to automatically align preselected orders of the accumulator register with the selection mechanisms, so that a transfer is prevented until the register is first placed in a predetermined ordinal position with respect to the selection mechanism—the transfer mechanism operating when, and only when, the proper ordinal position has been reached.

The present invention is concerned with these and other objects which will become apparent from a perusal of the description of the preferred embodiment of the invention, which is shown in the accompanying drawings, and in which:

FIG. 1 is a plan view of the preferred form of the machine embodied in the instant invention.

FIG. 2 is a cross-sectional view of the machine shown in FIG. 1, taken along a longitudinal plane extending through the selection, actuating, and registering mechanisms, such as planes substantially to the immediate right of the units order of the machine, as shown by the lines 2—2 in FIG. 1.

FIG. 3 is an enlarged detail plan view of the lower right-hand corner of the keyboard, showing particularly the keyboard locking mechanism.

FIG. 4 is an enlarged detail of a keyboard locking mechanism also utilized in the preferred form of the present invention.

FIG. 5 is an enlarged detail of the rear portion of FIG. 2, showing particularly the registers and closely related mechanisms.

FIG. 6 is a right side view taken on a plane to the right of the right side frame plate, such as along the plane indicated by the line 6—6 of FIG. 1, and showing particularly the clutch and tabulating mechanism associated with the present invention.

FIG. 7 is a left side view of the right side frame plate shown in FIG. 5, such as along the planes indicated by the lines 7—7 of FIG. 1.

FIG. 8 is, in effect, an extension of the forward end of the mechanism shown in FIG. 7 and constitutes a right-hand extension of that figure.

FIG. 9 is a cross-sectional plan view taken through an intermediate portion of the machine below the keyboard, and showing particularly the power-operated shifting and clearing mechanisms.

FIG. 10 is a rear view of the machine with the covers removed.

FIG. 11 is a right side view of the machine with the cover removed, showing mechanism to the right of that shown in FIG. 6.

FIGS. 12 and 13 are details of the tabulation mechanism shown in part in FIGS. 6 and 11.

FIG. 14 is a left side view of the machine with the covers removed, being taken along a longitudinal plane to the left of the left side control plate, such as along the plane indicated by the line 14—14 in FIG. 1, with parts not essential to the present invention omitted.

FIG. 15 is, in effect, an extension of the right-hand end of FIG. 14, constituting the extreme forward part of mechanism shown in FIG. 14.

FIG. 16 is a perspective view of the back transfer initiating shaft and related mechanisms.

FIG. 17 is a perspective view of the cyclically operated setting mechanism of the present invention.

FIG. 18 is a detail from the left taken on a longitudinal plane lying to the right of that shown in FIG. 14 and showing additional details of the setting mechanism.

FIG. 19 is a front view of the drive mechanism shown in FIG. 18 and in perspective in FIG. 17.

FIG. 20 is a right side view of the mechanism shown in FIG. 19, taken along a plane as indicated by the line 20—20 of FIG. 19.

FIG. 21 is an enlarged detail, with overlying parts removed, of the counting, or number-of-cycles-determining, mechanism in the preferred form of the present invention, being shown in its normal full-cycle position but with the back-transfer setting mechanism operated.

FIG. 22 is similar to FIG. 21, but with the parts rotated to the position they assume at the start of the last cycle of operation.

FIG. 23 is an enlarged and detailed plan view of a portion of the carriage and registers mounted therein, showing particularly the value sensing mechanism of the present invention.

FIG. 24 is a cross-sectional view through the value setting mechanism which lies immediately in front of the register shown in FIG. 23, the view being taken on the plane as indicated by line 24—24 of FIG. 26.

FIG. 25 is an enlarged detail of the sensing slide associated with the register dial and shown in part in FIG. 23.

FIG. 26 is a partial front view on an enlarged scale of the selection setting mechanism, such as taken along the transverse plane indicated by the line 26—26 in FIG. 1 and constitutes a front view of the mechanism shown in FIGS. 23 and 24.

FIG. 27 is a plan view of the selection slides of the machine of the present invention.

FIG. 28 is a detailed view taken from the left of the selection slides and the auxiliary setting members of the preferred form of the present invention.

I. CONVENTIONAL MECHANISMS

The present invention is applied, for purposes of exemplification, to a calculating machine of the general type shown and described in the patent to Carl M. F. Friden, No. 2,229,889, issued January 28, 1941. This basic construction, in the preferred form of the present invention, has been modified and improved by the automatic tabulating mechanism shown in the patent to Carl M. Friden et al., No. 2,403,273 of July 2, 1946, and other patents not here pertinent. However, the invention is not limited to incorporation in that particular machine as it can be incorporated in, or applied to, other calculating machines on the market. It is, therefore, to be understood that the machine shown in the accompanying drawings and described herein is for purposes of exemplification only and that the invention is not limited thereto.

*A. General Arrangement (FIGS. 1 and 2).*—It is conventional for calculating machines to comprise a frame, or body portion, A (FIG. 1) upon which is mounted a register carriage B, the latter being ordinarily shiftable in either direction with respect to the body portion A. The body portion A is provided with a cover 30, through which projects various keys, such as the value keys 31 of the main, or selection mechanism, keyboard; the ordinal clearing, or "0" keys 32; and various control keys, such as the plus bar 33, the subtraction key 34, the "add," or automatic single cycle, key 35, the keyboard lock key 36, the automatic tabulation control key 37 (commonly called the "dividend entry" or "DIV TAB" key), left shift key 38, the right shift key 39, the keyboard clear key 40 and register clearing key 41. The machine used for exemplification of the present invention, as shown in FIG. 1, also includes a division mechanism controlled by division keys which are not identified, as division operation forms no part of the present invention; and an automatic multiplication mechanism, such as shown in the Friden Patents Nos. 2,371,752 of March 20, 1945 or 2,399,917 of May 7, 1946, which likewise form no part of the present invention and hence are not identified.

A cover 50 of the carriage B contains a plurality of ordinally arranged windows 51 through which are visible dials 52 of the accumulator, or product register, and a second series of ordinally arranged windows 53 through which are visible dials 54 of the counter, or quotient register. It can be noted at this point that it is conventional to have approximately twice as many accumulator dials as there are orders of the selection mechanism, and one more counter dial than there are orders of the selection mechanism, as shown in FIG. 1. In the machine with which my invention is preferably associated, the carriage also contains a pair of manually operated clear knobs 55 and 56 for clearing, or zeroizing, the accumulator and counter registers, respectively. Preferably, also, the carriage will contain a plurality of ordinally arranged tabulator buttons 57 which control the ordinal position to which the carriage will be automatically shifted in certain operations, one of which will be described hereinafter.

The operating mechanism of the machine is, for the most part, supported upon a main frame, which includes a base 60 (shown only in FIG. 11), a right side frame 61 (FIGS. 6 and 9), a left side frame 62 (FIGS. 2, 5, and 9), a right side control plate 63 (FIG. 11), a left side auxiliary frame plate 64 (FIGS. 2, 5 and 8), lying to the right of left side frame 62 at the forward end of the machine, a left side control plate 65 (FIG. 14) at the extreme left side of the machine, and an auxiliary left side frame 66 (FIGS. 18 and 20) lying between the left side frame 62 and the left side control plate 65. The two side frames 61 and 62 are interconnected and braced by a plurality of crossbars 67, 68, 69 and 70 near the rear of the machine, as best shown in FIGS. 2 and 5. Similarly, the front portion of the machine is braced by a crossbar 71 (FIG. 2) which extends between the right frame 61 and the auxiliary left-hand side frame plate 64. Most of the operating parts are mounted on these crossbars and upon the side frames 61 and 62 or 64 which support the crossbars. The right control plate 63 lies immediately to the right of the right side frame 61 (as shown in FIG. 11), and upon it are mounted most of the control keys and their related mechanisms which are found on the right side of the machine. Similarly, the left side control plate 65 is mounted at the extreme left side of the machine (inside the cover) and supports most of the control keys and control mechanisms related to the multiplying mechanism as well as some of the parts utilized in the present invention. It can be noted that for the most part, the control mechanisms of the present invention are located on the left side, i.e., on the outside, of the left side control plate 65 and upon the left side auxiliary frame plate 66 which lies between the control plate 65 and the left side frame 62.

It should be noted that, for the sake of brevity, many mechanisms which are conventional in machines of this kind, such as the multiplying mechanism, the division mechanism, and the like, and which are not pertinent to the mechanisms of the present invention, are not described herein. Those parts which are conventional and which are indirectly related to the operation of this machine will be described as briefly as possible; while those mechanisms which are directly related to the operation of our invention, even though already known, will be described considerably more in detail. It will be understood, therefore, that we assume that our invention will be associated with a fully automatic calculating machine which has conventional features such as those mentioned, but that, for the sake of brevity, we will limit our description of conventional elements to those which directly or indirectly relate to the operation of this machine, or those conventional mechanisms which must be modified in their operation in order to provide for the most satisfactory operation of the mechanism of our invention.

*B. Keyboard (FIGS. 1 and 2).*—The value keys 31 and the "0," or ordinal clear, keys 32 are arranged in longitudinally extending ordinal rows and in transversely extending value banks, as shown in FIG. 1. The keyboard, in the preferred form of the machine, comprises a subassembly in which the keys are mounted in a keyboard frame 80 (FIG. 2) comprising top and bottom plates 81 and 82, respectively, front plate 83 and suitable rear plates and side plates, not identified. This keyboard frame is held together as a rigid unit by means of interlocking the side and end plates with the top and bottom plates in a conventional manner, the assembly being held together by suitable tie bolts, or rods, 84. The value keys 31 are mounted on the upper end of their respective key stems 85 which are slidably supported in aligned slots in the top and bottom frame plates 81 and 82 and upon pairs of tie rods 84, as is shown in FIG. 2. The key stems are biased to a raised position by suitable springs 86 which surround the upper portion of the respective key stem and are seated between the top plate 81 and the bottom of the key, or button, 31.

In the conventional machine shown, a manually operated, or depressed, key stem 85 is latched in its operative position by a conventional latching means which can comprise a longitudinally extending latching slide 90 associated with each order of the keyboard. Preferably, the latching slides are provided with a plurality of apertures 91 through which the coordinal key stems extend, the various slides being biased to a forward position by suitable springs not shown. Each key stem is provided with a rearwardly extending cam nose 92 above which is located a latching notch 93. The depression of a key 31 will cause the cam 92 on the key stem to force the latching slide 90 rearwardly against the bias of its spring until the key stem has been depressed sufficiently to cause the notch 93 to register with the latching slide, whereupon the latch snaps to its forward position in which it engages the notch to hold the key stem depressed. Whenever a latching slide is moved rearwardly by the depression of another key in that order, or by the operation of any of the keyboard clearing means, the slide 90 becomes disengaged from the notch 93, whereupon the key stem is snapped to its raised position by the force of its biasing spring 86.

The lower end of each key stem 85 carries a laterally extending stud, or pin, 94 which engages a differentially angled cam face 95 of one or the other of a pair of selection, or V-notch, bars 96 and 97, as shown in FIG. 2. It is conventional in the machine with which the present invention is exemplified, to provide a pair of selection bars 96 and 97 for each order, the former serving the "1" to "5" keys of that order and the latter the "6" to "9" keys of the order. Each of these selection bars is supported on a pair of rockable supporting arms 98 and is biased to a rearward, inoperative position by a suitable spring, such as spring 99. It is obvious that the depression of a value key 31 causes the pin 94 on the lower end of its key stem to engage the corresponding cam face 95, and, due to the differential angularity of the respective cam faces 95, to translate the selection bar 96 or 97 forwardly a differential amount. In view of the fact that the depressed key is latched in its operative, or fully depressed, position, the corresponding selection bar 96 or 97 is latched forwardly in its differential position by the engagement of the pin 94 with a latching notch, not shown, at the lower end of the cam face.

It has already been noted that the various keys 31 are latched in a depressed position by means of the latching slide 90 engaging a notch 93 in the operated key stem 85. It also has been noted that a depressed key can be released by operating another key in the same order, as the depression of the second key through its cam nose 92 moves the slide 90 rearwardly to its releasing position. A latched key can also be released by depression of the "0" key 32 of the same order, the "0" key having a cam face similar to the cam face 92 on the value key stems 85. A "0" key 32, however, has no notch similar to the notch 93, so that the key cannot be latched in its depressed position. All the keys of the keyboard can also be released by operation of a keyboard clear mechanism, which can be operated by manual depression of the keyboard clear key 40 (FIG. 1) or automatically through operations of certain mechanisms, such as the mechanism controlled by the add key 35.

This clearing mechanism comprises a transverse shaft 105 (FIG. 2) extending between the frame plates 61 and 64. The shaft carries a bail 106 rotatably mounted thereon. The bail, in turn, carries a series of ordinally arranged and slidably mounted brackets 108 which extend upwardly to engage ears 107 formed on the forward end of the coordinal latching slides 90, the slides being extended through the front frame plate 83 of the keyboard assembly, as shown in FIG. 2. Hence the rocking of the bail 106 (clockwise in FIG. 2) causes the upper end of the bail arms 108 to engage the ears 107, thereby forcing the ordinal latching slides 90 rearwardly to release any depressed key stems. It is conventional, in machines with which our invention is illustrated, to provide a bellcrank, not shown, rocked by depression of the keyboard clear key 40 and which engages an arm on the bail 106. It is also conventional to automatically rock this bellcrank, and consequently the bail 106, by automatic means at the end of each cycle of operation, if the add key 35 is set to condition the machine for such operation. As these two mechanisms are not pertinent to the present invention they will not be described herein.

The keyboard assembly 80 is provided with a conventional keyboard locking mechanism which can be activated by a conventional mechanism under the control of the keyboard lock key 36. This mechanism has no relationship to the present invention and hence will not be described, except for the particular means used to lock the keyboard. It will be seen in FIGS. 2 and 3 that a locking slide, or comb, 110 lies in front of the front plate 83 of the keyboard assembly 80 and behind the turned-down ears 107 of the respective latching slides 90. This slide is mounted for transverse movement across the front of the keyboard, riding upon a plurality of pins 111, as shown in FIG. 2. This locking slide, as best shown in FIG. 3, is provided with a series of ordinally arranged notches 112 which normally lie in registration with the turned-down ears 107. The locking bar 110 is normally biased to the right by any suitable means, such as a spring 113 tensioned between a stud 116 on the bar and the frame plate 61, so that its right-hand end abuts against the right-hand frame plate 61, as shown in FIG. 3. The right-hand end of the bar is formed with a diagonal cam face 114 which is adapted to be engaged by the tail of a lever 537, in which event the locking bar 110 will be cammed to the left to the dotted position shown. When the locking bar 110 is so shifted, a portion of the forward edge 115 of the locking slide will be moved so as to lie behind the turned-down ear 107 of the ordinal latch slides 90. In that event the latch slides 90 cannot be moved rearwardly, so that no depressed key can be released and no undepressed key can be operated. In this event the keyboard is completely locked and may not be manipulated in any way.

C. *Selection Mechanism* (FIGS. 2 and 5).—It has been mentioned that the lower end of each key stem 85 carries a laterally extending pin 94 adapted to engage the differentially angled cam face 95 of one or the other of the selection bars 96 or 97. It was also indicated that it was conventional in the machine with which our invention is shown, to provide a pair of selection bars 96 and 97 for each order of the keyboard, the former serving the "1" to "5" keys in that order and the latter the "6" to "9" keys. It is, therefore, obvious that the depression of the value key causes the pin 94 on the respective key stem to engage the corresponding cam face 95 and, due to the differential angularity of the respective cam faces, to translate the selection bar 96 or 97 forwardly a differential amount.

The selection bars 96 and 97 extend rearwardly (to the right in FIGS. 2 and 5) and are provided at their rearward extremities with perpendicularly formed yokes 120 and 121, respectively. These yokes engage angular slots formed in the collars, or hubs, of a pair of selection gears 122 and 123, respectively, the gears being slidably but nonrotatably mounted on a longitudinally extending selection, or square, shaft 124. The square shaft is journalled in the crossframe members, or crossbars, 67, 69 and 70— there being one such square shaft for each order of the keyboard and actuating mechanism. The selection gears can be arranged on their square shafts in any suitable manner, but it is conventional to place those of one order toward the front of the machine and the adjacent order toward the back, as shown in FIGS. 2 and 5, in order to permit closer spacing of the orders of the machine. All of these gears are moved forwardly diffenential amounts corresponding to the value of the keys depressed, as is conventional in the art.

The rear end of each square, or selection, shaft 124 carries a digitation control spool 130 (FIGS. 5) slidably but non-rotatably mounted thereon. The forward end of the spool carries an addition gear 131 and the rear end carries a subtraction gear 132—the spool and the two gears forming an integral assembly. The two gears 131 and 132 are adapted to engage the ordinally related accumulator gear 150 when the spool 130 is displaced from its central, or neutral, position shown. The spools 130 are moved in unison to either operative position by means of a gate 133 extending transversely across the machine and lying between the two integral gears 131 and 132. The gate 133 is preferably mounted on a pair of arms 134 which are rigidly mounted on a digitation control shaft 135. Normally, the assembly comprising the shaft 135 and gate 133 is held in the intermediate, or neutral, position shown by means of a centralizer conventional in the art but not shown herein. However, various controls, some of which will be mentioned hereinafter, are effective to rock the shaft 135, and consequently displace the digitation control spools 130 forwardly or rearwardly, as the operation demands. Such displacement of the control spools operatively connects the accumulator gears 150 to either the additive, or plus, gears 131 or the substractive, or minus, gears 132. Subsequent differential rotation of the selection gears 122 and 123 will thus drive the accumulator gear, and parts connected thereto, incremental amounts in either sign character direction.

D. *Actuating Mechanism* (FIG. 5).—The actuating mechanism of the machine shown is of the well-known Thomas-type. This type of actuating mechanism comprises a number of stepped drums 140 arranged transversely of the machine. These drums are mounted on parallel shafts 141 extending longitudinally of the machine and parallel to the square, or selection gear, shafts 124. It is conventional in the Friden machine, which is used to exemplify this invention, to provide one actuator shaft 141 for each pair of square shafts 124, and to mount two drums 140 on each of these shafts 141—one of the drums to serve the order to the right of the actuator shaft and the other drum to serve the order to the left. These actuator drums are provided with differentially stepped teeth, so that forward translation of either of the selection gears 122 or 123, from their "0" position shown, causes that gear to lie in the path of travel of a number of teeth on the associated actuated drum corresponding to the value key 31 depressed. It is conventional in the Friden machine to use two identical drums on each drive shaft and divide each drum into two portions, one serving the "1" to "5" keys and the other spaced slightly to the rear of the first section to serve the "6" to "9" keys, as shown.

The actuator shafts 141 are driven through miter gears 142 mounted on the forward end thereof, each of which gears meshes with a corresponding miter gear 143 ordinally mounted on a main drive shaft 144, the ordinal arrangement best being shown in FIG. 9. The main drive shaft 144 is given a complete cycle of rotation with each machine cycle, thereby rotating the actuators 140 a complete revolution in each machine cycle and consequently giving the selection gears 122 or 123 and square shafts 124 increments of motion depending upon the longitudinal position of the selection gears on their square shafts.

It can be mentioned that it is conventional, in machines of this kind, to provide a Geneva stop for each square shaft 124, so angularly disposed thereon as to positively stop rotation thereof at the termination of the digitation phase of a cycle of operation. It is also customary in these machines to start the ordinal digitation operation of the values differentially, in an inverse order, and to stop digitation of all values in the order simultaneously. Thus, a single Geneva wheel and Geneva block will afford a positive stopping action of the square shaft 124 and consequently of the register dials 52 at the end of each digitation phase of a cycle. It is also conventional to provide a second opening on the Genevas to enable a tens-transfer which has been conditioned in the machine to take place shortly after the digitation phase.

E. *Accumulator Register* (FIG. 5).—The accumulator register, containing a series of ordinally arranged register dials 52, is mounted in the shiftable carriage B. In the machine shown in FIG. 1, the accumulator register contains twenty such dials 52 for a selection mechanism of ten orders. The various ordinal assemblies in the register comprise the dial 52 and the accumulator gear 150, both of which are mounted upon a common dial shaft 151. Preferably, the dial shafts are journalled in a hollow frame bar 152 which forms one of the major frame members of the carriage B. The differential rotation of the square shaft 124, caused by the longitudinal translation of selection gears 122 or 123, and the subsequent rotation of the corresponding actuator 140, is, upon the rocking of the gate 133 from the neutral position shown, effective to rotate the dials 52 additively or subtractively. It can be mentioned at this point that the carriage frame B comprises, in addition to the hollow frame bar 152, a front carriage rail 153 held in spaced relationship to the hollow bar 152 by suitable end plates 154 (FIG. 23). The carriage is laterally shiftable, the front rail 153 riding on bearing blocks or on rollers, or other suitable bearing members, 155 mounted on the crossbar 68, and the frame bar 152 being provided with a ledge 156 that rides upon a bearing bracket 157 attached to the rear crossbar 70.

It also can be mentioned here that the register dials 52 can be returned to a "0" position by any suitable clearing, or zeroizing, mechanism. The clearing mechanism shown in this embodiment is the one normally found in machines of this type, as illustrated by Patent No. 2,229,889, above-mentioned. This mechanism comprises a mutilated gear 160 mounted on each accumulator dial shaft 151, the adjacent ordinal gears preferably being offset vertically, as shown in FIG. 2. These mutilated gears are engaged by a clearing rack 161 of conventional construction, upon longitudinal movement of that rack (transversely of the machine). Normally, in the inoperative position of the clearing mechanism, the respective clearing gears 160 lie opposite blank spaces in the rack, so that the gears and the shafts 151 upon which they are rigidly mounted, are free to rotate. However, the operation of the clearing rack, as by means of the manual clear knob 55 (FIG. 1) mounted on the right end of the rack, causes the teeth of the rack to engage the clearing gears and to rotate the dial assemblies to their "0" position. At this point further rotation of the dial shaft assembly is blocked by a blocking mechanism not here pertinent. It can also be mentioned here that power-operated means are conventionally provided for power clearing of the register, and automatically in some instances, and such a mechanism will be described hereinafter under the heading of "Register Clearing."

It should perhaps also be mentionoed at this point that there is a tens-transfer mechanism between the various orders of the register, but this mechanism has no relationship to the present invention, so it will not be described. However, reference can be made to the above-mentioned patent to Friden, No. 2,229,889 for a detailed description of a preferred form of this mechanism.

*F. Counter Register (FIGS. 5 and 7).*—The carriage B also contains a counter, or quotient register, comprising the ordinally arranged dials 54. As shown in FIG. 1, it is conventional to provide a series of ordinally arranged counter dials 54 containing a number of dial assemblies approximately half that of the accumulator register—in the machine shown in FIG. 1, eleven such counter dials are utilized as compared to twenty accumulator dials 52 and ten orders of the selection mechanism including the value keys 31. This number of dials is selected to provide one more than the orders of the selection and actuating mechanisms, and one more than the ordinal position of the carriage B, so as to provide an overflow dial in the event that ten or more cycles of operation are performed with the carriage in its extreme right-hand position. The counter dials 54 are rigidly mounted on ordinally arranged and longitudinally extending shafts 166, the rear ends of which are journalled in bearings in the carriage frame bar 152 and the forward ends of which are journalled in bearings formed in the front carriage rail 153. Each dial assembly also includes a feed gear 167 and an integral tens-transfer control plate 168 formed as a spool and rigidly mounted on the shaft 166. Each assembly also includes a conventional mutilated clearing gear 169—all of which clearing gears are adapted to be engaged by a clearing rack 170, which may be of the conventional style disclosed in the Friden patent previously mentioned, so that longitudinal translation of the rack (as by manipulation of knob 56 in FIG. 1) returns each counter dial to its "0" position.

A counter actuator 175, preferably of conventional construction, is mounted on a transverse shaft 176. As is conventional in the art, this shaft is given an oscillatory, or rocking, motion in a plane perpendicular to the axis of the shaft, and also a longitudinal translation parallel to the axis of the shaft, with each cycle of machine operation. The actuator assembly comprises a pair of end plates 177 (one of which is seen in FIG. 5 and the other in FIG. 7) rigidly mounted on the shaft; a crossbar 178 carried by the two end plates; and a series of ordinally arranged counting fingers 179 rotatably mounted on the shaft but biased to rock therewith by means of springs 180 tensioned between the counting fingers 179 and the crossbar 178. The counting fingers 179 are formed to overlap the one to the right (adjacent lower order), so that blocking of rocking of any finger disables all those lying to the left thereof. Thus, in each cycle of operation, the counting finger 179 of the lowest, or units, order of an actuating mechanism will, if permitted to rock, mesh with the ordinally aligned gear 168, and will then be translated in one direction or the other to give the gear a single increment of motion and thus enter a count of "1" into the dial 54 aligned with the units order of the actuating mechanism. The operation of the counter actuator and its ability to effect the necessary tens-transfers between orders of the counter is not pertinent to the present invention and hence will not be described.

It should be noted that if a block is placed under a tail 181 (shown in FIG. 7) on the right end of the units order counting finger 179, its spring 180 will be forced to yield, and the counting finger is blocked against rotation and the counter is inoperative. In order to block operation of the counter actuator, or finger, 179, the tail 181 is provided with a laterally extending ear 182. A slide 183 (shown in FIG. 7) cooperates with the ear 182 of tail 181 to prevent operation of the units order actuating finger. The forward end of this slide is slidably held in a notch in the crossbar 69, while the rear end is pivotally connected to the bail 133 which determines additive or subtractive operation. When the bail is in the neutral position shown, an ear 184 on the forward end of the slide engages the ear 182 on the rear end of the arm 181, thereby blocking any rocking of this arm as a result of the rocking of the shaft 176. Rocking of the arm 181 can also be blocked by a blocking mechanism to be described hereinafter under the heading of "Automatic Carriage Shift."

*G. Drive Mechanism and Clutch (FIG. 6).*—Various mechanisms of the machine, including the actuator shafts 141, are given cycles of operation as required by means of ac onventional electric motor, not shown. The armature of the motor is conventionally connected to a short shaft 187 by a flexible coupling, not shown. The shaft 187, as shown in FIG. 6, extends through, and is journalled in, the frame plate 61 and at its outer end carries a small pinion 188 secured thereto. The pinion meshes with a larger idler gear 189 which is rotatably mounted on a stub shaft 190 secured to the frame plate. The idler 189, in turn, meshes with a still larger gear 191 which is rotatably mounted on the main drive shaft 144. The gear 191 forms the driving side of a conventional clutch 192, the driven plate 193 of which is rigidly secured to the drive shaft 144. The engagement of the clutch members is controlled by a clutch dog 194 which is pivotally mounted on the clutch plate 193 and is resiliently biased into engagement with a ratchet 195 formed integrally with the driving gear 191. The operation of the clutch dog 194 is controlled by a clutch pawl 200 which is pivotally mounted on the frame plate 61 by any suitable means, such as a screw stud 201. Whenever the clutch pawl 200 is rocked (clockwise in FIG. 6), it releases the clutch dog 194, which is then spring-biased into engagement with the ratchet 195 to cause engagement of the clutch and the rotation of drive shaft 144. Preferably the clutch is provided with a full-cycle control device of conventional construction.

In the conventional machine with which our machine is preferably associated, the clutch pawl is operated by a link 202, the rear end of which is pivotally connected to the upper end of the clutch pawl. The forward end of the link is pivotally mounted on a two-armed lever 203, which lever is pivotally mounted on the frame plate by any suitable means, such as a screw stud 204. A long pin 205 is riveted on, or otherwise rigidly secured to, the lower end of the lever 203, the pin extending inwardly through an aperture in the frame plate in order to support the forward end of a long switch control link 206 (also shown in FIG. 7). The rear end of the switch control link 206 is slotted to engage a supporting pin 207 mounted on the frame plate 61. The rear end of this long link has a turned-down nose 208 adapted to cooperate with a suitable switch, not shown, such as a conventional microswitch, to control the flow of power to the motor, also not shown. By this construction the clutch pawl 200 and the switch control link 206 are operated in unison to simultaneously engage the clutch and close the power switch to the motor.

The clutch pawl is resiliently held in its clutch-disengaging position shown, and the switch control link in its open position, by any suitable means, such as spring 209 (see FIG. 6) tensioned between a stud on the frame plate and an ear on a control link 210. This link 210 is pivotally mounted on the pivot pin which interconnects the clutch control link 202 and the switch lever 203, previously mentioned. Both the clutch pawl 200 and the switch control link 206 can be operated by various mechanisms, most of which are effective to translate the control link 210 rearwardly, as is conventional in the machine of the patents above-mentioned. The clutch and switch can also be operated by a lever 334 (FIG. 7) which is effective to engage the pin 205 which interconnects the switch control link 206 with its associated lever 203, as will be described in connection with the operation of the automatic carriage shifting mechanism described under the heading "Automatic Carriage Shift."

H. *Register Clearing (FIGS. 2, 5, 9 and 10)*.—The accumulator dials 52 and the counter dials 54 may be cleared, or returned, to their "0" registration positions, by a conventional power-operated clearing means, which is best shown in FIGS. 9 and 10. It has already been mentioned that these registers may be cleared by operating the clear racks 161 and 170 (FIG. 5) engaging mutilated clearing gears 160 and 169, respectively, and that the racks can be operated manually by means of their respective knobs 55 and 56. These racks, either or both selectively, at the will of the operator, can also be operated by means of a power-operated clearing bar 215, best shown in FIG. 10. This bar is slidably mounted on the carriage frame bar 152 by suitable pin-and-slot connections, such as the slots 216 in the bar embracing flat-headed pins 217 secured on the rear face of the frame bar 152. Normally, this bar is biased to the left (to the right in FIG. 10) to its inoperative position by a spring 218 tensioned between the left-hand pin 217 and a stud 219 on the power-operated bar 215. The clearing bar 215 is connected to the clearing knobs 55 and 56 through conventional brackets which are not here pertinent, for the automatic clearing of the registers is not involved in the present invention but the disablement of the conventional clearing mechanism is. It, therefore, suffices to state that the power clear bar is conventionally connected to the clearing knobs, but the particular structure of the mechanism therefor is not pertinent.

The clearing bar 215 is adapted to be driven by a power mechanism on the left-hand side of the rear of the machine, (to the right in FIG. 10) and includes a clearing cam 220. This cam is mounted on a stub shaft 221 journalled in the rear crossbar 70 and a bracket 22 mounted to the rear thereof, the shaft 221 being aligned with the leftmost actuator shaft 141, as shown in FIG. 9. The forward end of this stub shaft, lying on the front side of the cross bar 70, carries a driven plate 223 of a clutch of the type described in the patent to Matthew, No. 2,679,916. In the form illustrated in the drawings, and particularly FIG. 9, the driving member 224 of the clutch is mounted on the leftmost actuator shaft 141, which, in this instance, is extended rearwardly of its bearing plate 69 to terminate adjacent the rear plate 70. This clutch member carries a driving tongue 225 pivotally mounted thereon, which, when rocked rearwardly, engages a notch in the driven plate 223 and thereby causes a rotation of the driven plate from rotation of shaft 141.

The position of the driving tongue 225 is controlled by a conventional control member 230 mounted on the rear end of a sectionalized, or telescopic-type, clutch control bar 231. The control bar, or pusher rod, 231 is journalled in crossbars 67 and 69 and is resiliently biased toward the front of the machine by a suitable compression spring 232 compressed between the crossbar 67 and a collar on the front end of the control rod, as shown. The control rod 231 can be moved rearwardly by a pusher link 233 against the force of its spring 232, thereby rocking the driver tongue 225 into engagement with the notch in the driven plate 223 to place the clutch in engaged, or driving, position. The rear end of this pusher link 233 is provided with a shoulder 234, as shown in FIG. 2, that engages the front end of the clutch control bar 231. The front end of the link is pivotally mounted on an arm 235 that is rigidly secured on the left end of a transverse shaft 236. The shaft 236 is rocked (clockwise if viewed from the right as in FIG. 2) from the depression of either the register clearing key 41 or the dividend tabulating key 37 (FIG. 1). When so rocked, the rocking of arm 235 and the translation of pusher link 233 translates the control bar 231 rearwardly to place the clutch in operative position.

It was mentioned before that the automatic clearing of the registers is no part of the program of the present invention, so that we are not concerned with the clearing mechanism per se. However, it must be noted that in conventional operation, the clearing clutch is engaged when the shaft 236 is rocked, and this shaft is rocked whenever the automatic shifting mechanism is placed in operation. It is, therefore, necessary, in transferring a value from the register back into the selection mechanism, that the clearing clutch be disabled and the clearing operation be prevented. A mechanism for this purpose is shown in FIGS. 2 and 9 and comprises a disabling arm 240 pivotally mounted on the transverse shaft 236. This arm is in a plane adjacent to that of the pusher link 233 and is provided with a perpendicular ear 241 which underlies the rear portion of the pusher link 233. The upper edge of the forward arm of this disabling bellcrank engages a pin 242 rigidly mounted on the free end of an arm 243 which is carried at the right end of a short shaft 244. This shaft extends from the auxiliary left-hand side frame 64 to the left-hand control plate 65. The left end of this shaft carries an arm 601 (FIG. 14) which is operated by the conditioning for operation of the back-transfer mechanism of the present invention, as will be described in connection with that mechanism. However, for the moment it suffices to note that the rocking of shaft 244 (clockwise in FIG. 2 or counter-clockwise in FIG. 14) rocks the disabling lever 240 in the contrary direction and thereby lifts the pusher link 233 from engagement with the clutch control rod 231. It can be noted that almost simultaneously therewith the setting shaft 236 is rocked (also clockwise in FIG. 2) to push the pusher link 233 toward the rear of the machine, whereupon the lower edge of that link, in front of the shoulder 234, will ride upon the upper surface of the rod 231, so that the pusher link and clutch control rod cannot become engaged throughout the operation of the program initiated by the back-transfer mechanism.

*I. Carriage Shift (FIGS. 5, 9 and 10).*—It has previously been mentioned that carriage B is shiftable in either direction with respect to the frame, or body, A of the machine. The carriage is shiftable by power under the control of the manually operated keys 38 and 39 (FIG. 1), and also in certain automatic operations, one of which will be described in the next section. This carriage shifting mechanism is shown particularly in FIGS. 9 and 10, and some is shown in FIG. 5, and is essentially that shown and described in the patent to Carl M. Friden et al., No. 2,380,642 of July 31, 1945 as modified by the clutch mechanism shown in the patent to Matthew, No. 2,679,916 issued on June 1, 1954.

A movement of the carriage is controlled by a left shift clutch 250 and a right shift clutch 251, best shown in FIG. 9. Preferably these clutches are of conventional construction and preferably are mounted on the two rightmost actuator shafts 141. In the machine shown in the exemplification of this invention, it is conventional for these actuator shafts to be driven with each cycle of machine operation, regardless of the nature of the operation, so that normally the clutches are disengaged. As shown in this figure, these clutches are of the same type as that described in connection with the shift clutch 223, 224 and hence need not be described in detail. The operation of the left shift clutch 250 is under the control of a left shift rod 252, which is resiliently urged toward the front of the machine by a suitable compression spring 254. Similarly, the right shift clutch 251 is under the control of a right shift rod 253, similarly biased toward the front of the machine by its compression spring. The positioning of the left shift control rod 252, from operation of the left shift key 38, is controlled by a pusher link 260 mounted on an arm 261, the arm being rigidly mounted on a shaft 262 which is rocked by depression of the left shift key. The right shift control rod 253 is also operated by a pusher link 263 which is pivotally mounted on an arm 264, the arm being rigidly mounted on the left end of a sleeve 265 that is journalled on the shaft 262. This sleeve is rocked by depression of the right shift key 39 by means not shown in the drawings and not pertinent to the present invention.

Rearward movement of the clutch control rod 252 or 253 operates the respective shift clutches 250 and 251 to connect an actuator shaft 141 to the shifting mechanism, which will now be described. The driven member of the left shift clutch 250 is mounted on a shaft 270 journalled in the rear frame plate 70 and a bracket 271 mounted thereon. A gear 272 rigidly mounted on the shaft is constantly engaged with a larger gear 273 of a compound gear, which compound gear is rotatably mounted on a second short shaft 274 journalled in the rear cross plate 70 and the bracket 271. The smaller gear 275 of the compound gear assembly meshes with a gear 280 rigidly mounted on the shift shaft 276. The driven member of the right shift clutch 251 is mounted on a shaft 277, also journalled in the rear crossbar 70 and its bracket 271, and carries adjacent its rearward end a gear 278 (see FIG. 5). This gear lies in a plane to the rear of gear 272 and meshes with a wide idler 279 that is constantly enmeshed with gear 272. By this means the shift shaft 276 is rotated in opposite direction from the unidirectional rotation of both of the right-hand actuator shafts 141, thus enabling the shifting of the carriage in either direction at the will of the operator.

The shift shaft 276 carries a shift plate 285 which carries a plurality of shift pins 286 which are adapted to engage the notches 287 ordinally arranged in a shift rack 288. The rack is mounted on the rear side of the hollow frame bar 152 of the carriage B, so that the rotation of the shift plate 285 causes the shifting of the carriage in the proper direction.

The terminal notch 287 on the right end of the shift rack 288 (at the left side of FIG. 10), is formed by an override pawl 290 pivoted on the rack by any suitable means, such as stud 291. The pawl is resiliently biased into alignment with the notches by any suitable spring, such as a tension spring 292, tensioned between an ear on the pawl and a stud on the rack—in which position of the pawl a notch formed therein constitutes the terminal notch of the rack. The lower edge of the pawl is provided with a cam face adapted to be engaged by one of the rotating pins 286 when the drive plate 285 attempts to move the carriage to the left beyond the extreme left-hand position, thereby rocking the override pawl 290 on its pivot (counter-clockwise when viewed from the rear as in FIG. 10). The outer, or right-hand, end of the pawl is formed as a nose 293 which, in the extreme left-hand position of the carriage, overlies an ear 294 formed at the upper end of a slide 295. The slide 295 is mounted on the rear side of the cross plate 70 by suitable pin-and-slot connections, such as that constituted by screws 296 threaded into the cross plate 70 and embraced by slots 297 in the slide. The slide 295 is resiliently biased to its upper position by any suitable means, such as a spring 298, tensioned between it and an extension on the rear bracket 271 as shown. The lower end of the slide is formed as a bracket, or ear, 299 which overlies the rear end of the horizontal arm of a bellcrank 305 (see FIG. 7) which is pivotally mounted on the digitation control shaft 135. The vertical arm of the bellcrank, extending downwardly from the shaft on which the bellcrank is mounted, is pivotally connected to a forwardly extending link 306, as best shown in FIG. 9. This link is connected at its forward end to the upstanding arm of a transverse bail 307 pivotally mounted on the transverse shaft 236. The bail 307 carries an arm 308 which underlies the pusher link 260 associated with the left shift control rod 252, so that the rocking of the bail from the rocking of the override pawl is effective to lift the pusher link from engagement with the left shift control rod. Thereupon the compression spring 254 of that rod will snap the rod forwardly to a clutch-disengaging position. It should be noted at this point that the left leg of the bail 307 is bent leftwardly, as best shown in FIG. 9, to provide an extension 309 which underlies the pusher link 233 of the clearing clutch mechanism and also a control link of the tabulating mechanism to be described in the next section.

It can be noted at this point that the shifting mechanism of the present machine varies slightly from that in the conventional machine of the type shown. In the conventional machine the shift rack has ten ordinal slots, so that the machine can be shifted nine ordinal steps. Such shifting does not enable the twentieth, or highest, order accumulator dial to become ordinally aligned with the highest order of the keyboard, that dial being reserved entirely for overflow use. However, in the present invention, the shifting mechanism of the conventional machine is modified to provide an eleven-place, or ordinal position, rack, so that the twentieth order dial is aligned with the highest order of the keyboard when the carriage is shifted to its extreme right-hand position. This change is made in order to enable any value which can be accumulated in the accumulator to be set into the selection mechanism, even one which has been accumulated in the so-called "overflow" dial.

*J. Automatic Carriage Shift (FIGS. 6, 7 and 10 to 13, inclusive).*—Preferably the machine of the present invention is provided with what is commonly known as a "carriage tabulating" mechanism, i.e., an automatic mechanism for shifting the carriage to a preselected ordinal position. Conventionally, such a mechanism has been used to shift the carriage to a desired ordinal position and thereupon to enter a dividend into the accumulator, such as is shown in the patent to Carl M. Friden et al., No. 2,403,273 of July 2, 1946. In the present invention it is desired to use this tabulating mechanism without clearing the register, as was conventional in the program operation described in that patent, or the entry of the keyboard factor into the register as soon as the carriage had reached a preselected ordinal position. In the present invention we prefer to use an automatic tabulating, or carriage shifting, mechanism to shift the carriage to a preselected ordinal position before operating the back-transfer mechanism—for by such means we are enabled to automatically operate around a preselected decimal point in the selection mechanism and in the accumulator register. It will be understood that this mechanism is not essential to a back-transfer operation, but, when combined with the mechanism of the present invention, it provides means for the entry of the accumulated values into the selection mechanism around a preselected decimal point, i.e., the decimal point in the accumulator is aligned with the decimal point in the selection mechanism. The modifications of the conventional mechanism will be mentioned in connection with the operation of that mechanism, but for the moment the conventional mechanism will be described.

This automatic carriage shifting, or tabulating, mechanism is under the control of a "Dividend Entry," or, as it is commonly called, a "DIV TAB" key 37. This key, as is best shown in FIG. 6, is mounted on a long key stem 315 which is mounted for vertical movement on the right-hand frame plate by conventional pin-and-slot mountings, such as slots 316 in the key stem engaging studs 317 on the frame plate. This key is biased to its raised position by any suitable means, such as a spring 318 tensioned between studs on the key stem and a stud on the frame plate, not shown. When depressed, the key is latched in its operative position by means of a latch link 319 engaging above a shoulder 320 formed on the key stem, the latch 319 being biased to a forward, or latching, position by a conventional spring, not shown. The lower end of the key stem is slotted, as at 321, to embrace a pin 325 secured to the rearwardly extending arm of a bellcrank 326. The bellcrank 326 is pivotally mounted on the frame plate 61 by any suitable means, such as upon a pin 327, riveted or otherwise rigidly secured to the frame plate. The depending arm of the bellcrank carries a stud 328 at its lower end, which stud engages the upper edge of a cam-shaped extension 329 of an arm 330 rigidly secured to a transverse shaft 331. Thus the depression of the dividend entry key 37 rocks the bellcrank (clockwise in FIG. 6) and the shaft 331 (clockwise in FIG. 6 or counter-clockwise in FIG. 7). The shaft 331, which extends transversely across the machine and is operated by several of the control keys in the machine with which our invention is exemplified, carries, adjacent its right end and immediately to the left of the frame plate 61, an arm 332 (see FIG. 7). The upper end of this arm is provided with a pin 333 which engages the right end of a rocker 334 which is pivotally mounted on the right end of the shaft 236. The rearwardly extending arm of this rocker is bent to form a shoulder 335 behind the pin 205 which connects the switch control link 206 to the intermediate lever 203 that operates the clutch control pawl 200. Thus, the rocking of shaft 331 (counter-clockwise in FIG. 7) rocks the rocker 334 (clockwise in this figure) to move pin 205 forwardly and hence pull the switch control link 206 to its switch-closing position and rock lever 203 and clutch pawl 201 (clockwise in FIG. 6) to cause engagement of the clutch.

It should also be noted at this point, that the rocking of the shaft 331 is effective to latch the left shift clutch and the register clearing clutch in their operative positions (it being remembered that the clear clutch control mechanism will be disengaged in a back transfer operation by means to be presently described). The mechanism for this purpose is shown in detail in the patent to Machado, No. 2,650,761 of September 1, 1953 (the shaft 331 herein being shaft 200 of that patent). This automatic shifting of the carriage to the left and the normal clearing operation is controlled by the rocking of shaft 331 which, as just noted, is rocked by depression of the dividend entry key. An arm 340 (FIG. 9) is rigidly mounted on the shaft 331, at about the center of the selection mechanism. A link 341 is mounted on the upper end of the arm 340 by a suitable pin-and-slot connection, not shown, and is biased to follow movement of the arm by means of a spring 342. The rear end of the link is pivotally mounted on one arm of a V-shaped, eccentrically mounted member 343. The eccentric is mounted on a power shaft 344 which is constantly geared to the main drive shaft 144 by means of miter gearing 345, an intermediate shaft 346 and miter gearing 351, so that the shaft 344 and hence eccentric 343, rotate constantly with the main drive shaft 144. The other arm of the eccentrically mounted member 343 is shaped as a hook (not shown) adapted to engage a pin 347 on an arm 348 that is pinned to the shaft 236. In the normal position of the parts, the hook on the V-shaped, eccentrically mounted member does not engage the pin 347, but when the shaft is rocked and the link 341 is translated rearwardly to rock the eccentric, the hook will engage the pin at the outer end of its stroke and will thereby rock arm 348 and shaft 236 as it returns to its full-cycle position. These mechanisms are latched in the adjusted position by means of a latch arm 349, thereby holding the shaft 236 in its rocked position.

It will be recalled that the shaft 236 carries the arm 235 which supports and positions the pusher link 233 associated with the clear clutch previously described, so that rocking of the shaft 236 normally causes engagement of the clear clutch when the carriage reaches its extreme left-hand ordinal position. In addition, the shaft 236 carries a second clutch control arm 255 rigidly mounted thereon. This arm supports a pusher link 356 similar in shape to the pusher 233 shown in FIG. 2. The rear end of this link is provided with a shoulder which engages a pin 357 riveted to an arm 358 which forms the left end of a sleeve assembly 359. The sleeve assembly 359 is rotatably mounted on the shaft 262. On its right end it has an integral arm 360 which carries a long pin 361 lying between the shoulder, not shown, on the rear end of the left shift pusher link 260 and the front end of the left shift control rod 252. A very light spring 362 holds the sleeve rocked to the position in which pin 361 engages the front end of the clutch control rod 252, the spring 362 being much weaker than the spring 254 which biases the clutch control rod toward the front of the machine.

The rocking of shaft 331 from the depression of the dividend entry key thus has two effects: (1) it operates through lever 332 and rocker 334 (FIG. 7) to cause the closing of the motor switch and the engagement of the clutch; and (2) it positions the V-shaped, eccentrically mounted member 343 in an angular position in which its hook will engage pin 347, and hence rock the clutch control shaft 236 (clockwise if viewed from the right). The rocking of the shaft 236, through the arm 355 mounted thereon, the pusher link 356 and sleeve 359, forces the left shift clutch control rod rearwardly to close that clutch and cause a leftward shifting of the carriage. In view of the fact that the dividend entry key is latched down, this shifting of the carriage will continue until the extreme left-hand ordinal position is reached. Thereupon the rocking of the override pawl 290 (FIG. 10) and the resultant rocking of bellcrank 305, the translation of link 306 and the rocking of bail 307 (FIG. 9) causes a disablement of the left shift clutch. This effect is secured by the rocking of the bail 307, the leftward extension 309 of which underlies the pusher link 356, as is shown in FIG. 9. The lifting of the link 356 enables the left shift control rod 252 to return to its normal inoperative position, thereby rocking the sleeve 359 so that the pin 357 on the left arm thereof will underlie the link 356 forwardly of the shoulder formed thereon. Thus, although the shaft 236 is locked in its rocked position, the mechanism is ineffective to again control operation of the left shift clutch. It can be noted that this automatic mechanism is held in the adjusted position, although it may be ineffective to control operation in the latter portion of the operation, so long as the shaft 331 is held in its rocked position by the latching of the dividend entry key in its depressed position. It can be noted also that when the key is released and the shaft 331 returns to its normal position, a pin 350 on the arm 340 (which is rigidly mounted on the shaft 331) lifts the latch member 349 and thereby releases shaft 236 and the parts controlled thereby.

A third effect of the depression of the dividend entry key 37 will be to condition a control mechanism for operation (which operation is initiated by the rocking of the override pawl) that will be effective to cause engagement of the right shift clutch and condition a right shift terminating mechanism for operation when the carriage reaches a preselected ordinal position. Incidentally, this preselected ordinal position is determined, in the preferred form of our invention, by the depression of one of the ordinally arranged shift control, or "tabulator," buttons 57 (FIG. 1) representative of the ordinal positions to which the carriage can be shifted. The control mechanism just mentioned is best shown in FIG. 7 and is operated by a two-armed lever 368. This lever is pivotally mounted intermediate its length on a pivot pin 369 affixed to the left side of the right-hand frame plate 61. The forward end of the lever is provided with a pin 370 which engages the lower end of the key stem 315, so that this lever is rocked (clockwise in FIG. 7) by depression of the dividend entry key. The rear end of the lever 368 carries a roller 371 rotatably mounted thereon which engages the lower edge of the lower arm of a V-shaped bellcrank 375 which forms the right-hand leg of a bail 376 (see also FIG. 10). The bail, as best shown in FIG. 10, is rotatably mounted on a short shaft 383 which extends between the frame plate 61 and an intermediate bracket 384 actually mounted on the base. The other arm of the bellcrank carries a pin 377 which engages a slot in the lower end of a two-armed lever 378 (FIGS. 6 and 7) which is pivotally mounted on the frame plate 61 by any suitable means, such as a pin 379. At its upper end the lever carries a counter blocking slide 380 pivotally connected thereto by any suitable means, such as a pin 381. The blocking slide 380 carries an ear 382 normally lying behind the tail 181 of the right-hand, or units order, counter actuator. However, the rocking of the bail 376 (counter-clockwise in FIG. 7), from the depression of the key 37, rocks the lever 378 (clockwise in this figure), thereby positioning the ear 382 under the ear 182 on the tail of the counter actuator 179. By this means the counter actuator is disabled for so long as the key 37 is latched in its depressed position.

A left-hand leg 388 of the bail 376 is extended upwardly and forwardly, as shown in FIG. 7. At its upper end it carries a slide 389 pivotally mounted thereon by any suitable means, such as a pin 390, the slide extending rearwardly to a point below the slide 295 operated by the override pawl 290. This slide, or link, 389 is provided with a hump 391 normally lying forwardly of the bracket 299 of the override slide 295. However, the rocking of the bail 376 (counter-clockwise in FIG. 7) positions this hump 391 underneath the bracket 299. Thereafter, the depression of the slide 295 from the operation of the override pawl will cause the bracket 299 to engage the hump 391, thereby depressing the rear end of the link 389. The rear end of the link 389 is supported upon a pin 402 carried by an arm 401 of a second bail 400, which will be described in the next paragraph. For the present, however, it will be noted that depression of the rear end of link 389 will cause rocking of arm 401 downwardly.

A second bail is associated with the previously mentioned bail 376, being mounted upon the same shaft 383 as bail 376, as best shown in FIG. 10. The left-hand leg 401 of this bail extends upwardly and rearwardly and at its terminal end carries the pin 402 (see FIG. 7). It was mentioned in the preceding paragraph that this pin supports the rear end of the setting link 389. The left-hand leg also pivotally supports a right shift setting arm 403, shaped somewhat like the numeral "7" and pivotally mounted on the arm 401 by any suitable means, such as a pin 404. The upper end of this second arm is provided with a rearwardly extending crosspiece, or member, 405, which, as shown in FIG. 9, bears against the forward side of the clutch control bracket on the rear end of the right shift clutch rod 253. A spring 406, tensioned between ears on the associated arms 401 and 403, resiliently biases the second arm 403 to follow the rocking of the arm 401. It will be understood that when the override sensing slide 295 is depressed by the override pawl, as heretofore described, when the carriage is shifted to its extreme left-hand position and a further shift is attempted, the interposing of the hump 391 of link 389 between the pin 402 and bracket 299 on the lower end of the slide, causes the arm 401 to be rocked rearwardly (counter-clockwise in FIG. 7). It will be latched in this position by means described in the next paragraph, and when so latched, the spring 406 resiliently biases the nose 405 of arm 403 against the right shift clutch control member. As this operation takes place during a cycle in which an attempted left shift is being made, an interlock, not shown but conventional in the machine with which the present invention is shown, retains the left shift clutch in its engaged position and blocks engagement of the right shift clutch until the end of that cycle. At the end of that cycle, the interlock is released and the left shift clutch is disabled as hereinbefore explained. At this point the spring 406 is effective to cause engagement of the right shift clutch and the machine will immediately go into a right shift operation to be terminated when, and only when, the carriage reaches the ordinal position determined by the depressed tabulator button 57. If it should happen that the right-hand "0" tabulator button is depressed, then the shift terminating mechanism is conditioned for operation in the extreme left-hand position of the carriage and the shift will be terminated before the right shift operation can start. In conventional mechanisms this causes the entry of the dividend in this ordinal position of the carriage.

The bail 400 is latched in its adjusted position in which it is placed by the rocking of the override pawl and depression of slide 295. The right-hand leg of the bail is formed as a bellcrank 410 (FIG. 7), the lower arm of the bellcrank being provided with a perpendicular ear 411 adapted to engage a shoulder 412 on a latching arm 413. The bail 400 is biased to its inoperative position and the latch 413 to its latching position by any suitable means, such as a tension spring 414 tensioned between the leg 410 of the bail and the latch arm. The other arm of the right-hand leg of the bail projects upwardly and at its upper end carries a link 420 pivotally mounted thereon by any suitable means, such as a pin 421. The forward end of the link is pivotally supported upon an arm 422 by any suitable means, such as a pin 423. The arm 422 is pivotally mounted on the tabulation control slide 424 by suitable means, such as a pin 425. Normally the arm 422 lies forwardly of the forward end of a trigger, or latch release arm, 440 so that depression of the slide 424, and hence arm 422, will not release the trigger 440. However, when the bail 400 is rocked to its operative position (counter-clockwise in FIG. 7), the lower end of arm 422 lies immediately above the forward end of trigger 440. Then, and only then, the depression of slide 424 will cause the rocking (clockwise in this figure) of trigger 440. Such rocking of the trigger is effective to release a spring-powered setting member that, in conventional machines, is operative to throw the digitation control gate into its additive position, whereby the value standing in the keyboard will be entered additively into the accumulator register in order that it may be used as a dividend.

Before proceeding with the operation of the gate-setting member, it is perhaps well to discuss briefly the operation of the tabulating control slide 424. It was mentioned previously, in connection with FIG. 1, that a plurality of ordinally arranged tabulator buttons 57 are carried by the carriage B. Actually these tabulator buttons are mounted in the front carriage rail 153, as is shown in FIGS. 5 and 13. These buttons are spring-biased to a raised position by suitable springs 430, as shown in FIG. 13, and can be locked in a depressed position by means of a latching slide 431. When latched in a depressed position, the lower ends of these various tabulator buttons 57 lie in approximately the same horizontal plane as the fixed stud 432 shown in FIG. 13, and in that position engage a round stud 433 carried by an arm 434 pivotally mounted on the cross plate 68 by any suitable means, such as a pin 435 (see particularly FIG. 12). The right-hand end of this arm is provided with a perpendicularly extending ear 436 which overlies an ear 426 on the upper end of the tabulation control slide 424 (see both FIGS. 7 and 12). This tabulation control slide 424 is mounted for vertical movement on the right frame plate 61 by any suitable means, conventionally by a pin-and-slot arrangement including slots 427 in the slide embracing pins 428 mounted on the frame plate. Thus, the engagement of the round stud 433 with a depressed key 57 is effective to rock the arm 434 downwardly, whereupon it depresses the tabulation control slide 424. It has already been mentioned that the depression of the tabulating control slide 424 is effective, when the tabulation control bail 400 has been latched in its operative position, to release the latch release arm, or trigger, 440 which controls the operation of the digitation control gate. The lower end of this slide overlies a pin 415 on a forwardly extending projection of the latch arm 413, so that the depression of the slide 424 is effective to rock the latch 413 to its bail releasing position. When the bail is so released, the spring 414 rocks the bail (clockwise in FIG. 7) to its normal, inoperative position, so that the tabulation control mechanism is disabled at this point.

The trigger, or latch release, arm 440 is formed as the left-hand leg of a bail mounted on the shaft 383, to the right of the right frame plate 61 (to the left of that plate in FIG. 10). The right-hand arm 441 of this bail carries a pin 442 which abuts against the rearward edge of a latch arm 443 (see FIG. 6). This latch arm 443 is pivotally mounted on the right side of the frame plate 61 by any suitable means, such as a pin 444, and at its upper end carries a notch, or shoulder, 445 which engages an ear 446 on a gate-setting member 447. The latch 443 is biased into engagement with the ear 446 by any suitable means, such as a spring 448. Thus, the rocking of the trigger, or latch release arm, 440 (clockwise in FIG. 7 or counter-clockwise in FIG. 6) rocks the latch arm 443 (counter-clockwise in FIG. 6) to release the spring-powered gate-setting member 447. The gate-setting member 447 is released from its latch by the operation of the shift terminating mechanism, just described, shortly before the end of the terminal cycle of operation (roughly at about the 345° position, or about 15° before the end of the cycle).

The gate-setting member 447 is pivotally mounted on a stub shaft 453 supported between the right side frame 61 and a bracket 454 carried by the right side control plate 63, as best shown in FIG. 11. This gate-setting member is biased to an operative position (counter-clockwise of that shown in FIGS. 6 and 11) by a relatively strong spring 455 (see FIG. 11) which is tensioned between a stud on the frame plate and a pivotal connection 456 which connects a resetting link 457 to its cam follower arm 458. This follower arm is mounted on the right side control plate 63 by any suitable means, such as a pivot stud 459, and its upper end carries a roller 460 adapted to engage a crescent cam 463 carried by a gear 461 rigidly mounted on the right-hand end of the main drive shaft 144. Normally the roller 460 will barely touch the high lobe of the cam 463 in each cycle of operation, but when the latch arm 443 is released the spring 455 will pull the follower arm 458 rearwardly (clockwise in FIG. 11). At this point the roller engages the cam to prevent further rocking of arm 458 until nearing the end of the current cycle—at which time arm 458 is allowed to rock to the full extent of its throw. This rocking of arm 458 rocks the gate-setting member 447 to its operative position (counterclockwise in FIG. 11). At about two-thirds of the way through the cycle the roller will engage the follower and reset the gate-setting mechanism in its latched position—which resetting is completed just before the end of that cycle of operation. Thus, the gate-setting mechanism will be operated once, but only once, in the cycle immediately following the shifting of the carriage to the preselected ordinal position. It cannot operate further for the tabulation control bail 400 is released simultaneously with the release of the latch 443, so that the entire tabulating mechanism is disabled.

It can be noted that the rear end of the resetting link 457 carries a bracket 462 adjustably mounted thereon, which bracket is adapted to engage the switch-setting link 206 and thereby hold the motor control switch closed and the clutch engaged for the cycle required for the entry of the keyboard value into the accumulator and the restoring of the tabulating mechanism.

Heretofore it has been conventional to form the gate-setting member 447 as a two-armed lever rising upwardly from its pivot shaft 453. In the conventional machine the upper portion of this member, when the member is rocked (counter-clockwise in FIGS. 6 and 11) to its operative position, engages a stud 466 on the lower end of a two-armed lever 467. This lever 467 is rigidly mounted on the gate-setting shaft 135, so that the rocking of the gate-setting member 447 (counter-clockwise in these figures), engages the stud and rocks the lever 467 and gate-setting shaft 135 (clockwise in these figures) for additive operation. This sets the add gears 131 (FIG. 5) of the sign character control sleeve 130 into engagement with the dial gears 150, whereby the keyboard value will be entered additively into the accumulator. In the present invention, however, it is necessary to modify the gate-setting member 447 so that in conventional dividend entry operations the gate-setting member will operate the gate-setting member 467 in an additive direction, but in a back transfer operation it will rock the digitation control shaft 135 and the digitation control gate 133 in a negative direction, as will be explained hereinafter in the description of the back-transfer mechanism.

The gate-setting lever 467 of our invention is of conventional shape and operates in the conventional manner. It is extended upwardly to lie in front of a pin 468 which connects the dividend entry key latch link 319 to a supporting arm 469 of a three-armed lever 470. Thus, the rocking of the lever 467 to its additive position (clockwise in FIG. 11) will cause the latch link 319 to be pulled rearwardly, thereby releasing the dividend entry key 37 so that it may rise to its inoperative position. However, the opposite operation of the lever 467 (which occurs in a back transfer operation) will not release the latch 319.

In the present invention the gate-setting member 447 is considerably modified from that heretofore used. It is formed as a bellcrank pivoted at its elbow on the shaft 453. The lower leg is substantially the shape of the lower arm of the two-armed lever previously known. The other leg 475 extends rearwardly (to the right in FIGS. 6 and 11). The rear arm 475 of the gate-setting member carries two arms 476 and 477 pivotally mounted thereon by a common pin 478. The two arms 476 and 477 are biased to a retracted position with respect to each other by means of a spring 479 tensioned between suitable studs on the two arms. The first arm 476, which can be called the additive, or plus, arm, is formed as an angular arm, the angular portion extending forwardly adjacent the pin 466 on the arm 467. This arm has a shoulder 480 located to the rear of the pin 466 by a distance sufficient to permit rocking of the arm to its subtract position (counter-clockwise in FIGS. 6 and 11) by regular means without engaging the shoulder, but close enough to the pin that it will engage the pin 466 and rock the arm 467 to its additive position, when the gate-setting member is rocked (counter-clockwise in these figures). Thus, rocking of gate-setting member 447, when the arms 476 and 477 are in the positions shown, places the digitation control shaft 135 and gate 133 in their additive positions.

The other arm 477, which might be called the negative, or back transfer, control arm, extends upwardly as shown, and at its upper end carries an arcuate cam face 481. Then the arms 476 and 477 are rocked forwardly (counter-clockwise is these figures), this cam face is adapted to engage a roller 482 that is mounted on a bracket 483 riveted on, or otherwise rigidly secured to, a second arm 484 which is rigidly mounted on the digitation control shaft 135. When these arms 476 and 477 are so rocked, the cam edge 481 engages and underlies the roller 482, whereupon the rocking of the gate-setting member 477 (counter-clockwise in these figures) rocks the bracket 483 upwardly and arm 484 forwardly (also in a counter-clockwise direction in these figures), and thereby moves the digitation control shaft 135 and hence the digitation control gate 133 to the forward, or subtractive, position.

The gate-setting arms 476 and 477 are held in the additive position shown in these figures, or are rocked to the subtractive position by means of an arm 485 which is rigidly mounted on the right-hand end of a back transfer control shaft 486, as best shown in FIG. 6. A pin 487 carried by the upper end of this arm 485 is embraced within a slot 488 in the upper portion of the arm 477. Hence, the angular position of the shaft 486 and arm 485 determines the setting of the additive and subtractive control arms 476, 477, and hence determines whether the digitation control gate will be set to its additive or its subtractive position upon operation of the gate-setting member 477.

II. BACK-TRANSFER MECHANISM

It is believed that the mechanism of the present invention and its operation will be more readily understood if we first mention briefly the method of effecting the back transfer from the accumulator register into the selection mechanism. In the present invention we propose to set all of the selection mechanisms to a value of "1" and then operate the machine subtractively, so as to subtract "1" from the register dials in each order of the machine, in each cycle of operation. Each dial has a "0" cam effective to disable this setting mechanism when the dial either stands at "0" or returns to its "0" position during the back transfer operation. When this cam becomes effective it disables the setting mechanism, so that in subsequent cycles of the back transfer program no digitation can be effected in those orders in which the accumulator dials stand at "0." A total of nine operating cycles is therefore used to subtract the highest possible value of "9" in any order. Associated with this mechanism is a set of ordinally arranged pairs of slides or auxiliary selection setting members, interconnected by springs so as to be biased to operate as a unit—in effect being the equivalent of the auxiliary slide of the type shown in the patent to Grant C. Ellerbeck et al., No. 2,736,494 for the automatic extraction of square root. One section of this two-member setting slide is moved forward a single increment with each machine cycle until the coordinal dial registers "0," being driven by a mechanism quite similar to that in the Ellerbeck square root patent just mentioned, as will be obvious to those familiar with that machine. The other section of this two-member auxiliary setting slide is operable to set the selection bars 96, 97 and is blocked from movement during the back transfer operation, but, as soon as the block is removed, is effective to set the coordinal selection slides to a value position. Thus, in each order, simultaneously, the conventional digitation mechanism operates to subtract a value of "1" from the accumulator until the accumulator is returned to its "0" position, and the one section of the auxiliary setting member is fed forwardly a single increment while the other portion of the member is held against movement. When the coordinal dial returns to its "0" position, it disables the setting of the coordinal selection bar, returning it to its "0" position, so that no further values can be subtracted in that order of the machine. Simultaneously, with this return of the dial to its "0" position, the incremental feeding of the one section of the auxiliary slide is also terminated, so that the auxiliary slide remains in the position corresponding to the value originally in the accumulator dial. At the end of the operation, the block which holds the second section of the auxiliary setting member in its inoperative position is removed. Thereupon the spring which connects the two auxiliary members biases the second portion to the incremental, or differential, position of the first and thereby sets the coordinal selection bars in the same value position. Thus the value formerly in the accumulator dial is now set into the selection bars and will remain there until released by the operator.

1. *Back Transfer Control Key and Mechanism (FIGS. 1, 7 and 8).*—A back transfer key 500 is preferably mounted adjacent the right front corner of the machine, as shown in FIG. 1. This key is mounted upon the upper end of a lever 501 which is pivotally mounted on the left side of the right-hand frame plate 61, as shown in FIG. 8. The lever 501 can be mounted on any suitable pivot, but it is most convenient to rotatably mount it on a transverse shaft 502 extending across the front of the keyboard. A tail 504, integral with the lever 501, extends downwardly from the pivot shaft 502, the end of the tail engaging the front face of an ear 505 extending to the right from the keyboard clear bail 106. Thus, the rocking of the setting lever 501 first causes the operation of the clear bail 106, and thereby releases all of the selection bars in the machine and restores the selection mechanism to its "0" position. In the event the clearing of the keyboard is blocked by the setting of the keyboard lock bar 110 to its locking position, the rocking of the keyboard clear bail 106 is prevented and hence the operation of the control lever 501 is blocked. This interlock is perhaps not necessary, but it is desirable to prevent the operation of the back-transfer mechanism if a value is locked in any order of the keyboard. While the operation of the back-transfer mechanism, with a value locked in the keyboard, would not cause any damage to the machine, it would give an inaccurate transfer because the locking of a selection bar in a value position would prevent the setting of the selection mechanism under the control of the auxiliary setting members which are operated in the back transfer operation. Thus, it is desirable that the operation of the back transfer key 500 be prevented if a value is locked in the keyboard by the operation of the keyboard lock mechanism and the consequent displacement of the keyboard locking slide 110 from the position shown in FIG. 3. On the other hand, values which are in the keyboard in a normal manner are automatically released, so that the keyboard and selection mechanism are cleared before the back transfer operation can be initiated.

The rocking of the keyboard clear bail 106 is also effective to release any auxiliary setting member latched in a value position, so that it may be returned to its "0," or inoperative, position. This clearing is desired regardless of whether the conventional keyboard clear key 40 or the back transfer key 500, for in either event it is important that the auxiliary selection members be clear so that they will have no effect upon the selection bars. It is seen in FIG. 8 that a two-armed lever 510 is pivotally mounted on the frame plate 61 by any suitable means, such as upon a pivot stud 511 rigidly affixed to the frame plate. The lower arm of this lever is engaged by the rearward edge of the right-hand bracket 108 mounted on the rear side of the bail, whereby the rocking of the bail (counterclockwise in FIG. 8) rocks the lever 510 (clockwise in this figure). A longitudinally extending link 512 is connected at its forward end to the lever 510 by any suitable means, such as a pivot pin 513. The link 512, as shown in FIG. 7, extends rearwardly to a position adjacent the intermediate crossbar 68. The rear end of the link 512 is supported for both horizontal and vertical movement by means of a spring 514 tensioned between a spring seat on a laterally formed portion of the link, around a pin 515 riveted to the link, and to a stud 523 carried by the frame plate. The rear end of this link is formed to provide a vertically extending shoulder 516, a lower notch 517 and an intermediate slot 518 lying between the notch and the shoulder. Both the notch and the slot are adapted to cooperate with a pin 519 carried by the vertically extending arm of a bellcrank 520. Incidentally, the bellcrank 520 (which is mounted on a shaft 522) supports the right end of a clearing bail 521 which is effective to clear, or restore to "0," the back transfer auxiliary slides, to be hereinafter described. For the moment, however, it should be noted that the forward translation of the link 512 (to the right in FIG. 7) will, from the engagement of pin 519 by the rear wall of notch 517, rock the bellcrank 520 (clockwise in this figure). The rocking of the bellcrank will clear the back transfer setting mechanism, which, incidentally, will be held in that position (by a latch to be described in the next paragraph) until the carriage has been tabulated to the proper ordinal position and the back transfer operation is ready to begin. However, as soon as the back transfer key 500 is released, the link 512 will be restored to a rearward position by the force of spring 514, at which time the pin 519 will lie within the slot 518, but will not rise to its original position until the back-transfer mechanism is operated.

The pin 519, and hence the bellcrank 520 and bail 521, will be latched in the forward position (clockwise position in FIG. 7) to which they are rocked by the forward translation of link 512, by means of a latch arm 525. This latch arm is provided at its free end with a hook 529 adapted to engage and hold the pin 519. This arm is pivotally mounted on a transverse shaft 526. Adjacent the latch arm 525 is a second arm 527 rigidly mounted on the shaft 526. A spring 528 is tensioned between ears on the two arms, whereby the latch arm 525 is biased to a latching position (counter-clockwise from that shown in FIG. 7) and is thereby adapted to engage the pin 519. However, when the carriage has been shifted to the preselected ordinal position and the back transfer program is initiated, the shaft 526 is rocked (clockwise in this FIGURE) to release the auxiliary setting mechanism by means of which the auxiliary setting members, or slides, are set. The rocking of the shaft 526 and consequently the arm 527, through the engagement of the ear on arm 527 with the lower edge of latch arm 525, rocks the latch arm upwardly (clockwise in this figure) to release the pin 519. When this occurs the auxiliary slide clearing bail 521 is released and is returned to its normal, inoperative position.

One further effect of the forward translation of the link 512 is to operate the keyboard lock slide 110 (FIG. 3), after the keyboard clearing bail 106 has been rocked and then released, in order to latch the keyboard in a "0" position and thereby avoid misoperation on the part of an operator by attempting to depress some of the keys thereof. This is accomplished by mechanism shown in FIG. 8. A pin 533, adjacent the forward end of the link 512, lies within a notch 535 in the upper end of a two-armed lever 534. This lever is pivoted on the frame plate 61 by any suitable means, such as a screw 536. The lever 534 is formed with a downwardly projecting tail 537 which lies opposite the cam nose 114 (see FIG. 3) of the keyboard latching bar 110. When the link 512 lies in its extreme rearward position to which it is pulled by spring 514, the tail 537 lies in the dotted line position shown in FIG. 3. In this position it has cammed the keyboard lock to the left to locking position. This condition is reached when the link 512 is released at the end of the tabulating operation and is maintained until the conventional keyboard clear key 40 is operated, which, through conventional means, rocks the clearing bail 106 (counter-clockwise in FIG. 8) to clear the values out of the keyboard. This will automatically, through the lever 510, pull the link 512 forwardly sufficiently for the latching arm 525 to engage pin 519. This positioning of the link 512 holds the auxiliary slide clear bail 521 in its clearing position and holds the tail 537 in the full line position shown in FIG. 3 in which it has no effect on the keyboard lock slide 110. This, however, has no effect on any other operation of the machine because the position of the auxiliary clearing bail 521 is of no consequence in the normal operations of addition, subtraction, multiplication or division. Neither does the release of the keyboard locking bar 110 affect the other operations. In this situation, the rear end of the slide 512 is not depressed (as it is at the start of the back transfer operation), so that the link cannot move rearwardly for it is held in its forward position by latch 525. It should be noted here, that the key 500 also operates a second link which, by means to be described in the next paragraph, causes depression of the rear end of link 512, so that notch 517 disengages pin 519 and thereupon the spring 514 pulls link 512 rearwardly. At this point the pin 519 lies in slot 518 while latch 525 holds bail 521 in its rocked position. So long as the pin 519 lies in slot 518, and link 512 is in its rearward position, the lever 534 is in its operative position (dotted line position in FIG. 3) and the keyboard lock slide 110 is in its blocking position. When the link 512 is pulled forwardly by operation of the keyboard clear key 40, however, the rear end of the link is not depressed, and in that event the link is held latched by arm 525 and cannot effect operation of keyboard locking slide 110.

A link 540 (FIG. 8) is pivotally attached to the lever 501 by any suitable means, such as a pin 541. The rear end of this link is supported on an arm 542, to which it is connected by a suitable pivotal connection, or pin, 543. The arm 542 is mounted on a stud 544 preferably affixed to the right-hand frame plate of the keyboard frame 80. A second link 545 extending rearwardly from the arm 542 is also pivotally mounted on the pin 543. The two links and the control lever 501 are biased rearwardly by a suitable spring 547 tensioned between a stud 546 on the rear end of the link 545 and an ear 556 adjacent the forward end of a setting link 555. Normally the pin 546 rides on the top edge of a long notch 557 adjacent the forward end of the link 555, somewhat to the rear of a shoulder 558 adjacent the front end of that link. Thus there is some lost motion between the operation of link 545 and its pin 546, and the movement of link 555 caused thereby. The link 545 also carries a pin 548 riveted thereon at an intermediate point, as shown in FIG. 7. Normally this pin engages the upper edge of a vertical nose 551 formed on the forward leg of a bellcrank 549. The bellcrank 549 is pivoted on the keyboard frame 80 by any suitable means, such as a stud 550, and has a downwardly and rearwardly projecting leg which abuts the pin 205 connecting the switch control link 206 to the clutch control lever 203. Thus the forward translation of the pin 205, which occurs when the lever 203 is rocked to cause engagement of the clutch and movement of link 206 to close the motor switch, is effective to rock the bellcrank 549 (counter-clockwise in FIG. 7). The rocking of the bellcrank 549, through the engagement of nose 551 with pin 548, lifts the rear end of the link 545 and thereby disengages the pin 546 from the shoulder 558. This disengagement occurs in every machine operation, even one initiated by back transfer key 500, so holding the key 500 in its forward position will not interfere with the subsequent operation of link 555. The bellcrank 549 also serves as an interlock which prevents the operation of the back-transfer mechanism, which occurs only upon the forward translation of link 555, whenever any other control mechanism has been operated to initiate a machine cycle.

The link 555 is supported for longitudinal movement upon a pair of struts 559 which are pivotally supported on the frame plate by any suitable means, as by studs 560. A spring 561, tensioned between a seat in one of the struts and a seat in the link, biases the link rearwardly to an inoperative position. A shoulder 562 is formed on the rear end of the link 555.

The shoulder formed on the rear end of the link 555 is engaged by an ear 570 formed on the forward end of an arm 571, which arm is rigidly mounted on a transverse shaft 572. The shaft 572 is resiliently biased (clockwise in FIGS. 7 and 14 and counterclockwise in FIG. 16) by a relatively strong spring 573 (seen in FIGS. 14 and 17) tensioned between a stud on an arm 574 rigidly mounted on the left end of the shaft immediately adjacent the left side control plate 65 and an opposed stud mounted on the control plate. Rotation of the shaft 572, under the bias of this strong spring, is normally blocked by the engagement of ear 570 with the shoulder 562. Hence the forward movement of the link 555 to remove the shoulder 562 from under the ear, permits the shaft 572 to rock sharply (clockwise in FIGS. 7 and 14). Such rocking of the shaft enables the ear 562 to engage the shoulder 516 on the first-mentioned control link 512, thereby depressing the rear end of that link, so that the notch 517, at the rear end thereof, is released from the pin 519. Thereupon the link 512 is enabled to move rearwardly under the force of its spring 514 to operate the keyboard locking bar, as heretofore described.

The rocking of the shaft 572 is effective to initiate machine operation, initiate an automatic tabulating operation, and condition the machine for a back transfer operation as soon as the carriage reaches the selected ordinal position. These various operations will be described in the next section.

*2. Preliminary Conditioning Mechanisms (FIGS. 6, 7, 14, 16, 18, 21 and 22).*—The control shaft 572 is journalled in suitable bearings carried by brackets 568 and 569 mounted, respectively, on the right side frame plate 61 and the left side control plate 65. The shaft 572 is under considerable pressure from the relatively strong spring 573 to rock it to an operative position (in a clockwise direction in FIGS. 7 and 14 and in a counter-clockwise direction in FIGS. 6 and 16). Such rocking of the shaft 572 is effective to: (I) operate the dividend entry, or "DIVD TAB," mechanism; (II) condition the tabulating, or automatic shifting, mechanism to operate the digitation control gate 133 for subtractive operation instead of the conventional additive; (III) disable the operation of the clearing clutch which is conventionally operated by the automatic shifting mechanism, as previously described; and (IV) condition the back transfer control mechanism for operation upon the operating of the gate-setting member at the end of the automatic tabulating operation.

*(I) Operate Tabulating Mechanism.*—At its right end this shaft carries an arm 578 rigidly mounted thereon. The forward end of this arm has a perpendicularly extending ear 579 which overlies a shoulder 580 (see FIGS. 6 and 16) formed on the rear edge of the key stem 315 of key 37. Thus, the rocking of the shaft 572 from the force of its spring 573 is effective to depress the dividend entry key 37, and thereby initiate an automatic tabulation operation (the details of which have already been disclosed). The depression of this key, by this means, initiates machine operation by causing the engagement of the main clutch and the closing of the motor switch. Therefore, the machine operates, in the first phase of the back transfer operation, to automatically shift the carriage to a preselected ordinal position. This shifting operation is terminated when the carriage reaches the predetermined ordinal position, in the manner heretofore described.

*(II) Condition Digitation Control Gate for Subtraction.*—A third arm 585 is rigidly mounted on the shaft 572 (FIGS. 16 and 18), preferably being located immediately to the right of the left side control plate 65. A link 586 connects the lower end of this arm to the lower end of an arm 587 which is rigidly mounted on the left-hand end of the subtractive setting shaft 486. The shaft 486 is journalled in bearings in the right side frame plate 61 and the left side frame plate 62, as shown in FIG. 10. At its right end, as shown in FIGS. 6 and 11 and as previously described in connection with the modification of the conventional dividend entry mechanism, shaft 486 carries the arm 485. The rocking of this shaft and arm (counter-clockwise in FIGS. 6 and 16) is effective to set the subtractive control arm 477 on the gate-setting member 447 to its effective position. Therefore, the operation of the gate-setting member 447 at the end of the automatic shifting operation, is effective to condition the machine for the subtractive entry of values. Thus, the value "1" set in each order of the selection mechanism will, in this instance, enter this value subtractively into the register.

Normally the dividend entry mechanism will set the keyboard value once, and only once, into the accumulator register. This results from the fact that the gate-setting arm 467 (see FIGS. 6 and 11) is normally operated in an additive direction (clockwise in these figures) to engage extended pin 468 and thereby release the latch bar 319 which holds the dividend entry key 37 and its key stem 315 depressed. However, in the present operation, the setting of the subtractive arm 477 into operative position and the setting of the additive arm 476 to its inoperative position, causes the rocking of the shaft 135 and consequently arm 467 in the opposite direction. Thus, the arm 467 cannot release the latch 318 and the dividend entry key is held in its operative depressed position. Incidentally, the latch will be released in the last cycle of the back-transfer mechanism, which will be described in connection with the operation disclosed hereafter under the heading "Terminating Machine Operation." Thus, throughout the back transfer operation, the digitation control gate 133, from the setting of shaft 135, herein just mentioned, is effective to hold the machine in condition for continuous subtractive operations and the machine will so operate.

*(III) Disable Clear Clutch.*—The lower end of the arm 585, which is rigidly mounted on the shaft 572, carries a roller 592, as is best shown in FIGS. 16 and 18. The roller 592 engages the rearward edge of an arm 593 pivotally mounted on a shaft 594 which conventionally extends between the auxiliary left side frame 66 and the left side control plate 65. On this same shaft is pivotally mounted a conventional multiplier control arm 595 (see also FIG. 14). This arm 595 is adapted to be rocked downwardly by depression of either the accumulate multiply or the subtractive multiply keys of the machine with which our machine is preferably associated, and is shown and described in the patent to C. M. Friden et al., No. 2,399,917, issued May 7, 1946. The two arms 593 and 595 lie immediately adjacent each other on the shaft 594, and the arm 593 has a bentover portion 591 overlying the arm 595. Thus, the rocking of arm 593, which is caused by the rocking of shaft 572 and arm 585 (from the engagement of roller 592 with the rear edge of arm 593), also rocks arm 595. The arm 595 (which corresponds to the arm 522 shown in FIG. 11 of the patent just mentioned) is conventionally effective to: first, initiate machine operation and a left shift operation by rocking shaft 331 (counter-clockwise in FIGS. 7 and 14; and second, disable the clear clutch by rocking shaft 244 (counter-clockwise in FIG. 14 or clockwise in FIG. 2) to rock the disabling arm 240 and hence lift the clutch control pusher link 233 from engagement with the clutch control shaft 231, as has already been described. This result has been secured by mechanism shown in FIG. 14, including the angular extension 596 on the arm 595 which engages a pin 597 on an arm 598 pinned to the left end of the shaft 331. Thus, normally, the depression of the arm 595 rocks the shaft 331 to initiate machine operation, although, in our invention, machine operation is also initiated at the same time by the depression of the dividend entry key 37. The arm 595 also is provided with a pin 599 which is embraced by the bifurcated upper end of a link 600 that is pivotally mounted on an arm 601 pinned to the left end of shaft 244. Thus, the second effect of the depression of arm 595, and the important effect in this invention, is to rock the clear clutch disabling shaft 244 to disable the clearing operation. As already indicated, this is an essential feature in the present invention, although the rocking of shaft 331 is immaterial in this case, for the machine is already in operation resulting from the depression of the dividend entry key. However, as the two operations are practically simultaneous, the rocking of the shaft 331 from two sources is unimportant.

(IV) *Condition Back Transfer Program Mechanism For Operation.*—A final effect of the rocking of the shaft 572 is to release to an operative position a mechanism which is effective, upon the operation of the gate-setting member 447 (FIG. 6) at the end of the automatic tabulation already described, to initiate the operation of the back transfer programming controls. As shown in FIGS. 21 and 22, as well as FIG. 14, the arm 574 carries a pin 607 riveted to, or otherwise rigidly mounted thereon, adjacent the lower end. This pin is embraced within a slot 608 formed in the forward end of a link 609. The rear end of the link 609 is supported by an arm 610 of a bail 611 pivotally mounted on a transverse shaft 612. The right-hand leg of the bail is extended forwardly to form a gate lock arm 613, the profile of which is shown particularly in FIGS. 18 and 21. The forward end of the gate locking arm is provided with a downwardly opening notch 615, as shown in these figures. The notch 615 is adapted to engage a pin 616 mounted on the lower end of a conventional multiplier gate-setting lever 617 rigidly mounted on the digitation control shaft 135. Normally, with the shaft 135 and lever 617 in their neutral position, a flat face 619 of the arm 613 would engage the pin 616 when the bail 611 is rocked (to the position shown in FIG. 18), but when the shaft 135, and hence the lever 617 is rocked to the subtract position, the pin 616 registers with the notch 615, and the bail and arm 617 assume the position of FIG. 21. A relatively strong spring 618 biases the gate locking arm 613, and hence the bail 611 and link 609, into an operative position in which the pin 616 will be engaged in the notch 615, at the extreme interior portion thereof. When the back-transfer mechanism is in its normal inoperative position, the latching of shaft 572 and arm 574 in their cocked position (shown in FIG. 14) holds the forward end of the locking arm 613 upwardly and away from the pin 616 (clockwise from the position shown in FIG. 18). Whenever the shaft 572 is released by the operation of the back transfer control key, the rearward rocking of arm 574, from the force of spring 573, enables the link 609 to move rearwardly an intermediate distance from the force of spring 618 operating upon bail 611 to rock the bail (clockwise in FIGS. 18, 21 and 22) toward a locking position. At this time, the digitation control shaft is in its neutral position and the flat face 619 on the lower and forward end of the arm (forwardly of the notch 615) engages the pin 616, preventing full rocking of the arm 613 and its bail 611. This position is shown in FIG. 18 and continues until the gate-setting shaft 135 is rocked to its subtractive position by the automatic shifing mechanism heretofore described. When this action takes place, as the carriage B is shifted into the predetermined ordinal position, the lever 617 is rocked (clockwise from the position shown in FIG. 18 to that shown in FIGS. 21 and 22), whereupon the pin 616 registers with the notch 615. At this instant, the spring 618 snaps the arm 613 to the full extent of its throw, whereupon the pin 616 is latched in the bottom of the notch 615. Such an operation, of course, locks the digitation control gate 133, and the shaft 135 upon which it is mounted, in a subtractive position from which it cannot be released until the bail 611 is restored to its normal, inoperative position. The full rocking of the bail 611 to its fully locking position is effective, also, to pull the link 609 rearwardly from the intermediate position in which it was stopped by the engagement of the forward face 619 of the arm 613 with the pin 616. This final motion of the link 609 is effective to initiate the programming, or counting, mechanism of our invention and also to operate the back transfer setting members. The first-mentioned of these operations will now be described.

3. *Programming or Counting Mechanism (FIGS. 14, 21 and 22).*—It is seen in FIGS. 14, 21 and 22 that the link 609 carries a pin 625 riveted thereto, or otherwise rigidly mounted thereon. This pin is embraced within a slot 626 formed in the upper end of a short, two-armed lever 627. This lever is pivotally mounted on a pin 628 secured to the left side control plate 65—the pin being embraced within a pivoting slot 629 formed in the lever 627. This mounting obviously enables the lever 627 to be pivoted on the stud 628 and also to move longitudinally with respect to the pin. Normally such movement is restricted by means of a spring 630 tensioned between the pivot stud 628 and a stud 632 on the arm 627, whereby the lever 629 is biased downwardly, as shown in these figures, but can yield upwardly when forced to do so at the restore phase of the back transfer operation. The lower end of the lever 627 is notched to form a shoulder 631 (best shown in FIG. 21), which is adapted to engage a stud 638 on a three-sectioned, or compound mutilated, gear 639.

The gear 639 is rotatably mounted on a stub shaft 640 rigidly mounted on the control plate 65 and is adapted to be driven by a wide mutilated gear 641 rigidly secured to the extreme left end of the main drive shaft 144. The driving gear 641 is of a width corresponding to the three sections of the driven gear 639 which will be described in the next paragraph. This driving gear has a wide leading tooth 642 extending the full width of the gear and therefore adapted to engage each of the three sectors of the driven gear. Immediately behind the first tooth 642 are four teeth 643 formed on the outer end, or left-hand section, of the gear 641, and hence able to mesh only with the leftmost section of the compound mutilated gear 639.

The compound mutilated gear 639 is formed of three sections: A main gear section 649 mounted on shaft 640 adjacent the control plate 65; a settable gear section 650 mounted for rotary movement with relation to the main gear section 649; and a final gear section 651 forming the final, or left-hand, part of the gear assembly. The first and third sections 649 and 651 are securely keyed to the shaft 640 on which they are mounted and hence always turn in unison. The intermediate, or settable, section 650 is rotatably mounted on the shaft but is limited to rotation of one tooth-space by virtue of a pin-and-slot connection with the main gear section 649. This lost motion connection comprises a pin 652 mounted on the left-hand face of the gear section 649 and embraced within a slot 653 formed in the intermediate gear section 650. A spring 654, tensioned between the stud 652 and a stud 660 on the intermediate section 650, biases the intermediate, or settable, section to a retracted position shown in FIG. 21. This settable or intermediate, section 650 carries the pin 638 which is engaged by the shoulder 631 of the setting lever 627 previously mentioned.

The main gear section 649 is, in the embodiment shown, a twenty-six tooth gear with two teeth removed, the mutilated portion, or toothless section, lying opposite the gear 641 when the gear 639 is in its home position and the back-transfer mechanism is at rest. A single tooth 655 on the settable sector 650 normally lies in the plane of the first tooth on the main section. When the settable sector is rocked with relation to the first section 649, by the rocking of the setting lever 627 against the force of spring 654, the single tooth 655 thereon is projected ahead of the leading tooth of gear section 649 from the position shown in FIG. 14 to that shown, in FIG. 21. When in the projected position shown in FIG. 21, the tooth 655 will be engaged by the leading tooth 642 of the mutilated driving gear 641 and hence will be rotated thereby. Since the slot 653 is of a length equivalent to one tooth-space, the rotation of section 650 from gear 641 must of necessity, through the engagement of pin 652 with the trailing end of the slot 653, also rock the first section 649. The gear sector 649 is held in an adjusted position by a detent 656 (FIG. 14) pivotally mounted on the control plate by any suitable means, such as a stud 657, and biased into engagement with the gear by a suitable spring 658. This detent is provided with two spaced teeth 659, so that as the mutilated portion of the gear rotates by the detent, or holding pawl, 656, it will be held in its various adjusted positions by one or the other of the teeth 659.

The rocking of the setting lever 627 rocks the intermediate gear section 650 to the position shown in FIG. 21 in which its tooth 655 will be engaged by the leading tooth 642 of driving gear 641 and the rotation caused thereby will also rotate the main gear sections 649.

It will be recalled that the gate-setting member 447 is operated at approximately the 345° position in the terminal cycle of the carriage shifting phase of the operation. Hence, the shaft 135 and arm 617 are rocked at this position and the locking arm 613 falls at the same time. Obviously, the setting lever 627 is operated at this time, at which time the leading tooth 642 on the feed gear 641 will have passed the position in which it could engage the single tooth 655 on the intermediate portion 650 of the gear assembly 639. The gear 641, therefore, will not engage this tooth until more than halfway through the first succeeding, or what might be called the "setting" cycle of the back transfer operation. The gear 641 is shown in its full-cycle, or "0" degree, position in FIG. 14, and in FIGS. 21 and 22 at approximately the 240° position. Thus, the rotation of the gear assembly 639 takes place at, roughly, two-thirds of the way through each cycle, or at approximately the 240° to 300° position. Thus, the first cycle of operation following the setting of gear section 650 will be effective to rotate the two sectors 649 and 650 an angular distance equivalent to two teeth, and the gears will be locked in that position by the detent 656. Thereafter, in each succeeding cycle of operation, the driving gear 641 will be effective to drive the gear section 649 a distance equivalent to two teeth thereon. After the initial cycle of operation, and the release of tooth 655 of the intermediate gear section 650 from control by the tooth 642 of gear 641, the intermediate section will be retracted by its spring 654 and will thereafter play no part in the programming operation. This intermediate sector is used only to initiate the rotation of the compound multilated gear 639.

The third gear section 651 is of limited angular extent equivalent to seven teeth of the main section 649, as best shown in FIG. 21. It has a leading tooth 665, followed by a mutilated, or toothless space equivalent to two teeth on the main gear, and that, in turn, is followed by a series of four teeth 666. This gear section 651 lies in the plane of the four short gear teeth 643 on driving gear 641 and is utilized to cause an increased angular motion of the gear assembly 639 in the ninth and tenth cycles of operation of the compound mutilated gear 639 (equivalent to the counts of "8" and "9" in the program hereinafter described—for the first cycle is a setting cycle which conditions the machine for operation). The third gear section 651 is so angularly mounted on shaft 640 that its leading tooth 665 is in alignment with the eighteenth tooth of the main gear section 649, and hence will be one tooth-space removed from engagement by the leading tooth 642 of driving gear 641 at the start of the eighth cycle of operation. It will, however, be engaged by the second of the trailing teeth 643 of the driving gear and will, therefore, drive the gear assembly 639 forward an additional tooth-space—the toothless space following the leading tooth 655, enabling the other trailing teeth of the driving gear to pass by without effect upon the compound gear. At the end of this cycle of operation the gear assembly will lie in the position shown in FIG. 22, whereby the leading tooth 642 of the driving gear 641 can engage the last tooth on the main section 649 ahead of the four trailing teeth 666 of section 651, and these trailing teeth 666 will be engaged by the trailing teeth 643 of the driving gear 641. Thus, in the final cycle of operation the gear will be driven through five tooth-spaces. This increased angular increment is desired in order to provide for the restoring of all of the back-transfer mechanism to its original, and inoperative, position following the ninth operative cycle of the back transfer operation (the tenth cycle of operation of gear 639—for the first machine cycle was used only to set that mechanism into operative condition).

Associated with the compound mutilated gear assembly 639 is a cam 670, also rigidly mounted on the shaft 640. This cam has a single lobe 671 of an angular extent equivalent to the angular movement of the gear assembly in the last, or tenth, cycle of operation of gear 639. The lobe has, as best shown in FIG. 21, a steeply rising leading edge and a substantially radial trailing edge. In the inoperative position of the back-transfer mechanism, the lobe lies in the position shown in FIGS. 14 and 21. In this angular position, the lobe is engaged by the rearward end of a nose 672 of a cam follower 673, the rocking of which is adapted to set the value sensing and selection setting mechanisms described in the next section into operative position. Also in this home position (shown in FIGS. 14 and 21) a follower roller 783 on a second cam follower arm 782 lies immediately adjacent the trailing edge of the lobe 671 of the cam. Thus in the first, or setting, cycle of the gear 639, the cam follower 673 will rock from the force of its spring 674 to set both the value sensing and the selection setting mechanisms to be described in the next two sections. Such rocking of cam follower 673 will have no effect upon the second follower arm 782, which will be inoperative until the last cycle of operation. In the tenth cycle of the programmed series of operations involved in the operation of gear 639, the follower roller 783 (as shown in FIG. 22) will lie at the lower edge of the rising leading face of the lobe of the cam 670, so that this cycle of operation will rock the follower arm 782 to the full extent of its stroke, whereupon it will drop back over the trailing edge of the lobe. The rocking of this follower 782 is effective to restore the shaft 572 to its latched position, to release the dividend entry key 37, and to release the second section of the auxiliary setting members, as will be described under the heading of "Restoring Back Transfer Mechanism to Inoperative Position" hereinafter. Also, and substantially simultaneously therewith, in this final cycle of operation, the follower arm 673 will be rocked from the position shown in FIG. 22 to that shown in FIGS. 14 and 21, and will thereby disable the value sensing and selection setting mechanisms.

*4. Value Sensing Mechanism (FIGS. 14, 17 and 21 to 24, inclusive).*—The rocking of the cam follower arm 673 during the initial cycle of rotation following the setting of the back-transfer mechanism, i.e., the first incremental step of rotation of the compound mutilated gear assembly 639, is effective to set the value sensing mechanism to its operative position. This follower arm, as best shown in FIGS. 14, 21 and 22, is pivotally mounted on a stud 675 which is rigidly secured to the left-hand control plate 65. As is shown in these figures, it has a downwardly and rearwardly extending tail 676, at the extreme end of which is mounted a roller 677. This roller is adapted to engage the rearward edge of a tail 781 of the second cam follower lever 782, already mentioned, when the cam follower 673 is rocked to its operative position shown in FIG. 22. Normally, as shown in FIGS. 14 and 21, this roller is spaced rearwardly of the tail 781 of the second follower arm 782. The cam follower arm 673 is biased into engagement with the cam 670 (counter-clockwise in FIGS. 14, 21 and 22) by the spring 674 tensioned between an ear on the follower arm and a stud riveted to the control plate 65. Thus, as soon as the lobe 671 of the cam 670 rotates away from the home position shown in FIG. 21, the follower arm 673 rocks (counter-clockwise in these figures) from the position shown in FIG. 21 to that shown in FIG. 22. In other words, the follower arm 673 is released from the holding effect of the lobe 671 of the cam 670 at approximately halfway through the initial movement of gear assembly 639, or at roughly the 270° position of the setting cycle.

The upper end of the follower arm 673 is pivotally connected to a short link 680 by any suitable means, such as a stud 681. The rear end of the link 680 is pivotally connected to an arm 682 by any suitable means, such as a pin 683. The arm 682 is pinned to, or otherwise rigidly mounted on, the transverse shaft 526 which extends from the left side control plate 65 (as shown in FIG. 14) to a location adjacent the right frame plate 61 (as shown in FIGS. 7 and 26). This shaft is journalled in suitable bearings in the left frame plate 65 and in a bearing bracket 685, which actually is mounted upon the top crossbar of a frame 694 which encloses and supports the feeding mechanism to be described hereafter under the heading, "Incremental Adjustment of Auxiliary Slides." It is this shaft which rotatably supports the latch hook 525 (FIG. 7), the operation of which has already been described. It can be mentioned here that the shaft 526 has rigidly mounted thereon a number of ordinally arranged locking fingers 690, which are shown in their two extreme positions in FIGS. 21 and 22 and also in FIG. 24. Thus the rocking of the cam follower 673, through the linkage including link 680 and arm 682, rocks shaft 526, and all of the locking fingers 690 thereon, from the position shown in FIG. 21 to that shown in FIG. 22. The effect of such rocking of the fingers 690 will be described hereinafter in this section.

It has already been mentioned that the shaft 526 carries a number of ordinally arranged control fingers 690. The profile of these fingers is shown in FIGS. 2, 5, 21, 22 and 24. In the normal latched, or inoperative, position, the lower edges of these fingers engage a long pin 691 which pivotally connects a sensing arm 692 and a setting arm 693 (FIG. 24). Such engagement of the finger 690 with pin 691 holds the sensing arm 692 and setting arm 693 in an inoperative position shown in FIGS. 2 or 5 and 24. The assembly of ordinally arranged sets of sensing fingers and setting arms are supported in the frame 694 rigidly mounted between the right-hand frame plate 61 (see FIG. 26) and left side frame plate 62. This framework is mounted in the machine immediately behind the crossbar 67 (see FIGS. 2 or 5) and immediately above the rear ends of the selection slides (as best shown in FIG. 26). The framework includes a main crossbar 695 (see FIGS. 24 and 26); a number of ordinally arranged separator plates 696 secured to the crossbar 695 by suitable means, such as screws 697; a lower rear crossbar 698 which is suitably provided with slots which interlock with the respective separator plates 696; and a second rear crossbar, or comb 699. Each of the separator plates 696 is provided with a leftwardly extending bracket 700, as best shown in FIG. 26. The various ordinal assemblies of sensing arm 692 and setting arm 693 are supported in proper ordinal relationship by being mounted upon the common shaft 522 journalled in the framework 694, and particularly in each of the separator plates 696. The several assemblies of sensing fingers 692 and the co-ordinal setting arm 693 are resiliently biased to an operative position (indicated by the dotted lines in FIG. 24) by individual springs 702 (FIG. 23) tensioned between the pin 691 and the crossbar 699.

The rear end (right end in FIG. 24) of each sensing finger 692 is adapted to engage the front end of a co-ordinal sensing slide 710 (FIGS. 2 or 5, 23 and 25). These slides are mounted for longitudinal movement on the top of the carriage (below the cover plate 50) by means of a pair of longitudinal slots 711 in each slide engaging a pair of ordinally mounted pins 712. Preferably, each ordinal pair of pins is aligned with the coordinal dial, one of the pins being mounted in the front carriage rail 153 and the other in an interior bracket, or separating plate, 158 extending between the rail 153 and frame bar 152. These sensing slides are biased to a forward, or retracted, position, shown in FIGS. 5 and 25, by suitable springs 713 tensioned between an ear 714 on the rear end of the slide and a seat in a plate 715 affixed to the top of the carriage rail. It will be noted by a review of FIGS. 23 and 25 that each of the sensing slides 710 is provided with a large window, or aperture, 717 adapted to permit viewing of the coordinal counter dial 54 through its respective windows 53, in either position of the slide 710.

The rear end of each slide is formed as a cam-shaped nose 716 adapted to engage the lobe of a "0" sensing cam 720 mounted on the coordinal dial shaft 151. This cam is of limited angular extent, not exceeding the angular extent of the "0" space on the dial, which, in a ten-digit dial shown in the figures would be 36°. As shown in FIG. 23, this cam 720 lies in a forward position when the dial registers "0," and hence will engage the nose 716 of the coordinal slide 710, thereby forcing the slide forwardly. It should be noted at this point that the force of the springs 713 is considerably less than that of the springs 702, so that when the pins 691 are released by their holding fingers 690 the force of spring 702 will push its sensing finger 692 and the coordinal sensing slide 710 rearwardly—the latter against the force of its own spring 713.

When a sensing glide 710 is forced forwardly by the positioning of its associated cam 720 in the "0" position shown in FIG. 23, it forces the coordinal sensing fingers 692 forwardly to the full line position shown in FIG. 24, against the force of the latter's spring 702. When so positioned, the value sensing mechanism is in an inoperative, or "0," position. In contrast to this, when the nose 716 of a slide is not engaged by the coordinal cam 720, the slide will be moved rearwardly from the force of spring 702, thereby allowing the coordinal sensing finger 692 to move rearwardly to the dotted line position shown in FIG. 24. In this position, the setting arm 693 is effective to set a value of "1" in the coordinal selection member for the purpose outlined in the first paragraphs of this section II. The mechanism just described, including the sensing fingers 692, the sensing slide 710 and the cam 720, provide a suitable mechanism for sensing the "0" or non-"0" condition of the dials aligned with the selection mechanism of the machine.

The setting finger 693 of each sensing assembly is extended downwardly to a point in which they overlap the coordinal "1" to "5" value setting bar 96, as shown in FIG. 24. Each of these bars 96 is provided with a pin 724 so located that upon movement of the sensing finger 692 to its extreme sensing position (shown in dotted lines in FIG. 24), the selection bar 96 will be moved forwardly to a "1" registration position. Thus, the release of the sensing mechanisms, by the lifting of the respective finger 690 is effective, in each order of the selection mechanism, to release the sensing finger 692 and setting arm 693 to the force of their respective spring 702. If the coordinal dial stands at a value of "0," then the cam 720 thereof will block movement of the sensing finger 692 and the arm 693 stays in its original (full line in FIG. 24) position and no value can be registered in that order. If, on the other hand, a value other than "0" stands in the coordinal dial, then the sensing finger 692 can move rearwardly and the setting arm 693 rocks to a value setting position (clockwise to the dotted line position of FIG. 24), whereupon it engages the coordinal pin 724 and moves the coordinal "1" to "5" slide forwardly to a value of "1." In that situation the coordinal selection gear 122 is moved to a "1" value position and the subsequent operation of the machine will cause a value of "1" to be entered into the register—subtractively in this instance because the machine has already been set for subtractive operation, as heretofore described. When the dial returns to its "0" position, as it must in nine cycles of operation, then the associated cam 720 engages the nose 716 on the coordinal sensing slide and forces that slide forwardly. Such operation of the slide forces the coordinal sensing finger 692 forwardly (from the dotted line position to the full line position in FIG. 24), thereby restoring the setting arm 693 to its "0," or inoperative, position. When this occurs, the spring 99 of the coordinal selection bar 96 will return that bar to its "0" position, disengaging the selection gear 122 from its actuator 140 and thereby terminating digitation in that order of the machine. Thus, in the nine cycles of operation in which the machine is operated subtractively, each selection slide 96 is set to a value of "1" unless the coordinal regster dial 52 registers a "0." Subsequent operation of the machine will, therefore, reduce the value standing in each order of the product register dials 52 aligned with the selection mechanism by a value of "1" in each cycle of operation. When each dial returns to "0" the sensing mechanism disables the setting of the coordinal selection bar 96, whereupon digitation terminates in that order of the machine. Thus, values in the orders of the register aligned with the keyboard will be rturned to "0" but will not go beyond that point.

*5. Back Transfer Auxiliary Members (FIGS. 2, 5, 17, 23, 42, 26 and 28).*—The setting of the several sensing mechanisms in one or the other of their positions is effective to enable or disable the operation of a coordinal auxiliary slide, or back transfer member. This member will be adjusted a differential amount corresponding to the distance between the consecutive values on the selection bars 96 and 97 (i.e., a value of "1") with each cycle of machine operation, when the sensing mechanism senses a value other than "0." When a "0" is sensed in the coordinal sensing mechanism, then simultaneously with the return of the selection bar to its "0" position, the incremental adjustment, or feeding, of the back transfer member is stopped and it is latched in the adjusted position. Then, at the end of the back transfer operation, means is provided for positioning the respective selection bars in a value position corresponding to that of this adjusted auxiliary slide, or back transfer, member.

The auxiliary, or back transfer member, just mentioned, is preferably a telescoping link comprised of a first auxiliary member, or slide, 730 which is incrementally adjusted in each cycle of operation (so long as a value stands in the coordinal dial 52) and a second member which is locked in an inoperative position during the adjustment of the first member and then sets the coordinal selection bar to the proper differential position as the back transfer operation comes to an end. The first member is slidably mounted in notches in the front crossbar, or comb, 71 and the intermediate crossbar 67 (see FIGS. 2 and 27). Associated with this cyclically adjusted member is a second, or auxiliary, member 731 which, preferably, is slidably mounted on the first member 730 by a suitable pin-and-slot connection which may comprise slots 732 (FIG. 2) in the second member which embrace pins 733 carried by the first member. The two members are resiliently held in a retracted position by a suitable tension spring 734 tensioned between ears on the two members and biasing the second member toward the front of the first, as is best shown in FIGS. 2 and 27. The second member 731 is effective to set the coordinal selection bars 96 and 97 to a value registering position, as will hereinafter be described under the heading "Setting Transferred Values into Selection Mechanism." For the moment it should be noted that throughout the back transfer operation this slide is locked in its rearward and inoperative position. However, the first member will be fed forwardly in the increments above-mentioned with each cycle of machine operation, being latched in each adjusted position, and, at the end of the back transfer operation, will have assumed a differential position corresponding to the value originally standing in the coordinal dial 52. At the very end of the back transfer operation the blocking means for the second member is released so that it may assume the position to which the first has been adjusted.

A rack 735 is formed on, or rigidly secured to, the rear end of the back transfer member 730 and is constantly engaged with a feed gear 740 which forms the smaller portion of a compound gear which includes the larger gear 741. There is one of these compound gears associated with each settable back transfer member 730, preferably one in each order of the selection mechanism, as is best shown in FIG. 26. These compound gears are rotatably journalled on a common shaft 742 mounted in the frame work 694 and are held in proper ordinal position by means of spacing sleeves 743 and 744 which abut against the adjacent separator plates 696. It perhaps should be noted at this point that the compound gear is held in any adjusted position by means of a detent 745 which has an ear 746 adapted to engage the interdental spaces of the larger gear 741. These detents are rotatably mounted on the shaft 522 and are biased into engagement with the gear 741 by a suitable torsion spring 747, as best shown in FIG. 24. The detent and its ear is so formed and arranged that rotation of the gear 741 in a feeding direction (clockwise in FIG. 24) cams the ear out of engagement with a tooth, but counter rotation is effectively blocked. Each detent is formed with a tail 748 extending behind the crossbar 698 and overlying the clearing bail 521, as best shown in FIG. 24 also.

It will be recalled that it was mentioned, in connection with the description of the operation of the initial conditioning slide 512 (FIG. 7), that the bail 521 is mounted on one arm of the bellcrank 520 pinned to the transverse shaft 522, the left end being supported by a like arm on the left end of the shaft. It will also be recalled that this arm 520 is latched in the rocked position (clockwise from that shown in FIG. 7) by the latch arm 525 during the tabulating, or automatic shifting, phase of the back transfer operation. This bail 521, when so rocked (clockwise in FIG. 7 or counter-clockwise in FIG. 24), rocks the detent 745 on its shaft 522 (counter-clockwise in FIG. 24). When the detent is so rocked the ear 746 thereon becomes disengaged from the teeth of gear 741, whereupon the slide 730 is free to return to its neutral, or home, position, best shown in FIG. 2.

The forward end of the slide 730, lying in front of the front cross-member 71, is projected downwardly to form a nose 736. A spring 737, tensioned between this nose and a seat formed on the rear bracket of the cross-member 71, biases the slide 730 to its rearward "0" or home, position shown in this figure. Thus, the initiation of the back transfer operation results in the rocking of the clearing bail 521 and the release of the slides 730 which are, therefore, returned to their "0" positions.

It will be recalled that the bail 521 was latched in its clearing position by the engagement of the hook latch 525 (FIG. 7) with the pin 519 on the bellcrank 520. It will also be recalled that with the depression of the dividend entry key 37, the rear end of the link 512 was depressed by the arm 571 (which depressed the key 37) and the pin 519 lay within the forward portion of the slot 518. The rocking of the shaft 626 in the initial cycle of the back transfer program, i.e., the initial incremental rotation of gears 639, resulting from the rotation of the lobe 671 of cam 670 (FIG. 21) out from under the nose 672 of cam follower 673, is effective to rock the arm 525 (clockwise in FIG. 7) to release pin 519 as well as to raise the sensing mechanism disabling fingers 690. Such release of the pin by the latch arm enables the bail 521 to return to its inoperative position, which it will do from the force of the various springs 747 acting in that direction. In this connection it will be recalled that while the latching arm 525 is loose on shaft 626, and hence will fall under the influence of its spring 528, it will be restored by the rocking of arm 527 immediately adjacent thereto, the arm 527 being pinned to shaft 626. This action will result from the fact that when the latching arm 525 is in its lowered, or latching position, the lower edge thereof will abut against the ear (unidentified) on arm 527 to which the spring 528 is attached. Thus, throughout the actual back transfer operation, the detent 745 is effective to hold the gear 741 to any position to which it may be adjusted, but the detents will be disabled by rocking of the bail 521 which results from any operation of the clearing bail 106 and consequent operation of link 512.

*6. Incremental Adjustment of Auxiliary Slides (FIGS. 2, 17 to 20, 23, 24 and 26).*—The incremental rotation of the compound gears 740, 741 essential to feed the auxiliary members, or back transfer slides, 730 forwardly, is shown in FIGS. 17 to 20, inclusive, and FIGS. 23, 24, and 26. It has been mentioned that these compound gears are rotatably mounted on the shafts 742 carried by the frame 694. The gear 741 is adapted to be driven a single tooth, or one value increment (assuming both of the gears 741 and 750 are ten-tooth gears as they are in our preferred form), in each cycle of operation by a two-tooth gear 755 which is normally disengaged from the gear 741 and which rotates at one-half the speed of the main drive shaft 144. As best shown in FIG. 26, the gear 755 normally lies in a plane to the right of, and therefore out of engagement with, the gear 741. The gear is slidably but nonrotatably mounted on its shaft 756, which, in the preferred construction, is a square shaft with the gear 755 being slidably mounted thereon. The square shaft is driven through an angle of 180° with each machine cycle by a drive gear train to be described shortly. The two teeth on the gear 755 are diametrically opposed, and as the gear rotates 180° in each cycle of operation, these teeth become operative in corresponding portions of succeeding cycles of machine operation.

For the moment it should be noted that the gear 755 is mounted on a long hub 757 in which is cut an annular groove 758. The groove 758 embraces a pin 759 mounted on the underside of a bellcrank member 760 (best shown in FIG. 17). These bellcranks are individually mounted on the coordinal brackets 700 extending to the left from each of the separator plates 696 (as best shown in FIG. 26) by any suitable means, such as the small bolts 761. These bellcranks are resiliently biased by a suitable spring 762 (best shown in FIG. 17) into a position to shift the gear 755 leftwardly into the plane of the larger gear 741 of the compound gear (clockwise in FIGS. 17 and 23). However, such rotation under the bias of spring 762, is normally blocked by the setting arm 693, for one leg of each bellcrank 760 engages the forward edge of the coordinal setting arm 693. Thus, the locking of the setting arm 693 in the blocking position shown in FIGS. 24 and 17 holds the bellcrank in the normal position shown in FIG. 17. As soon as any setting arm 693 is released for rearward movement of the sensing finger 692, the force of spring 762 rocks the bellcrank 760 to the position in which it will shift the two-tooth gear 755 to engage the gear 741. When this occurs, the half-speed rotation of shaft 756 will cause gear 755 to rotate gear 741 one incremental step in each cycle of machine operation. However, when the setting arm 693 is rocked in its normal, inoperative position (either from the blocking effect of control finger 690 or the return of the coordinal dial 52 to its "0" position and the forward movement of sensing slide 710 and sensing arm 692 caused thereby), it will rock the bellcrank 760 to its disengaging position. Thereupon the incremental feeding of gear 741 by gear 755 ceases.

The square shaft 756 is driven 180° with each machine cycle, or at half-speed at all times, this shaft being in direct gearing connection with the drive shaft 144, as is best shown in FIGS. 17 to 20, inclusive. A gear 770 is pinned to, or otherwise rigidly mounted on, the main drive shaft 144, preferably directly to the left of the auxiliary left side frame 66. This gear meshes with a larger idler 771 which is pinned to, or otherwise rigidly secured on, a short shaft 772. The shaft 772 is journalled in a suitable bearing in the auxiliary left side frame plate 66 and at its right end carries a pinion 773. This pinion, in turn, meshes with a second large idler 774 which is rotatably mounted on the auxiliary frame plate 66 by any suitable means, such as large stud 775. The large idler 774, in turn, meshes with a pinion 776 pinned to, or otherwise rigidly secured on, the square shaft 756. Thus, the square shaft 756 is given 180° of rotation with every complete revolution of the main drive shaft 144, regardless of whether the back-transfer mechanism is operated or not. However, such partial revolution of the square shaft 756 and of the gear 755 mounted thereon, is ineffective, except in back transfer operations, in which operations the locking finger 690 is released to enable rearward movement of sensing slides 692 and the consequent rocking of the setting arm 693 (counter-clockwise in FIG. 17 or clockwise in FIG. 24), which rocking of arm 693 enables the bellcrank 760 to rock from the bias of its spring 762 and place the gear 755 in operative relationship to driven gear 741.

Normally the secondary auxiliary slide 731, which is mounted on the primary auxiliary slide 730 by the pin-and-slot connections 732, 733 (see FIG. 2), is locked in its "0," or inoperative, position by means of a latching bail 830, best shown in FIG. 4. This bail is pivotally mounted on the transverse shaft 105 which supports the keyboard clearing bail already described. This bail has a series of ordinally arranged fingers 831 adapted to engage the forward ends of the secondary auxiliary slides 731 immediately adjacent the front face of the front crossbar 71. The bail is biased into such engaging relationship by means of a spring 832 tensioned between a bracket 833, preferably formed on the bottom of the bail in order to prevent twisting thereof, for the bail is subjected to considerable pressure from the combined forces of the various springs 734 which connect the two auxiliary members 730, 731. It can be noted here that the bail is provided with a forwardly extending arm 834 which is adapted to be engaged by a releasing arm 835 to rock the bail 830 (clockwise in FIG. 4) to releasing position. Preferably the two legs of the bail 830 are formed as shown in FIG. 4 and there are two releasing arms 835, both of which are rigidly mounted on the common shaft 502 which will be operated as hereinafter described—the two arms insuring that the bail will be rocked throughout its entire length without distortion, whereby all of the secondary auxiliary slides 731 will be released. When so released the secondary auxiliary slides will move forward to their adjusted positions determined by the position of the primary setting bar 730, whereupon the bottom edge of this secondary, or auxiliary, bar will overlie the fingers 831 and prevent return of the bail to its "0" position until the primary setting bars are released to return to their normal, or "0," position.

Each auxiliary setting bar carries a leftwardly extending arm 840, as best shown in FIG. 27. This arm extends under both of the coordinal selection bars 96 and 97 and is used to set these bars to the value position determined by the position of the auxiliary setting bar 731. As best shown in FIG. 28, the two selection bars are notched on their lower edges to receive the arm, or bracket, 840. A notch 841 of the "6" to "9" bar 97 has a length equivalent to five incremental steps of the primary setting bar 730, while a notch 842 in the "1" to "5" bar 96 has a length equivalent to nine such incremental steps. Hence, the "6" to "9" bar 97 will not be engaged by the arm 840 until the auxiliary setting bar 731 has moved forwardly five steps, so that for the first five incremental steps, the "6" to "9" selection bar 97 will remain at rest. On the other hand, the "1" to "5" selection bar 96 will be moved with the first increment of movement of the auxiliary slides by means of the resilient connection now to be described, although the slot 842, in this bar, has a length corresponding to nine incremental steps.

This resilient connection comprises a slide 843 mounted on the "1" to "5" selection bar 96 by pin-and-slot connections including slots 844 in the slide 843 embracing pins 845 riveted to the selection bar 96. A spring 846 is tensioned between a stud on the slide 843 and one of the pins 845 to resiliently hold the slide 843 in a retracted position. This slide has a downwardly projecting nose 847 which engages the front edge of the cross arm 840 carried by the secondary auxiliary slide 731. Hence, the slide 843 will be moved with each increment of movement of the secondary auxiliary slide 731, and so long as the forward movement of the "1" to "5" selection bar 96 is not blocked, it will move a corresponding amount. However, in the machine with which our invention is preferably associated, the forward movement of the "1" to "5" selection bar 96 is blocked at the end of five incremental steps by abutting a crossbar, not shown but normally provided in the machine. When such movement is blocked, the spring 846 will yield to permit continued movement of the slide 843 with movement of the secondary setting bar 731, during which time the "6" to "9" bar 97 will be set by the crossbar 840. The locking of the "1" to "5" selection bar in its "5" position does not interfere with the setting of greater amounts in the "6" to "9" selection bar, for, as is conventional in machines of this type, the "1" to "5" steps on the "1" to "5" portion of the actuators 140 are aligned with the first five teeth of the "6" to "9" portion of the actuator, as is shown in FIG. 2. By this means the movement of the secondary setting bar 731 will be effective to position the selection bars 96 or 97 in a value position corresponding to the position of the secondary bar 731.

For the moment it can be noted that the secondary slide 731 is blocked against forward movement during the nine incremental steps of movement which are provided for feeding the primary setting slide 730 forwardly. Such relative movement is permitted through the yielding of the spring 734. After the back transfer has been completed and the slides 730 are in their finally adjusted position, and after all of the sensing assemblies have been returned to their "0" position (which they must be during the final cycle of operation, for by that time nine incremental adjustments of the primary setting bar 730 will have been made and nine separate steps of subtraction of "1" from the coordinal dials 52 will have taken place), the blocks 831 are released, as will be described in the section entitled, "Restoring Back Transfer Mechanism to Inoperative Position."

7. *Setting Transferred Values into Selection Mechanism* (FIGS. 2, 4, 14 and 15).—In the tenth, or final, cycle of the back transfer operation, the lobe 671 of cam 670 will engage the roller 783 on cam follower arm 782, as is shown in FIG. 22, so that during this cycle of operation the cam follower 782 will be rocked against the force of its spring 784. It will be recalled that the compound mutilated gear 639 is rotated late in the cycle, so that digitation in this cycle of operation will have already occurred. That is, after digitation in this tenth cycle, i.e., the ninth cycle in which values can be subtracted from the dials 52 and the primary setting bars can be adjusted, the cam 671 will rock the arm 782. The rocking of this follower arm 782, which is rotatably mounted on shaft 675 adjacent the first follower arm 673, will be effective to release the latching bail 830 which holds the secondary setting slides in their "0" positions. As digitation will have already occurred in this cycle, all of the sensing assemblies including the sensing fingers 694 and the setting arms 693 will have been returned to their inoperative positions as, of necessity, the dial must return to "0" not later than the digitation phase of this cycle. Obviously, even if a value of "9" stood in the coordinal register dial at the start of the operation, it would be returned to "0" in this final cycle of operation. The return of a dial to "0" immediately restores the sensing finger 692 and the setting arm 693 to their inoperative positions (the full line position shown in FIG. 24) and the "1" to "5" selection bar 96 has immediately returned to its "0" position. Therefore, all of the selection bars will stand at "0" before follower arm 782 is rocked, so that the release of the latching bail 830 occurs almost at the end of that cycle of operation. Thus there can be no misoperation resulting from an attempted setting of the selection bars from the auxiliary setting slides 730, 731 while one or more of the bars are set to a value "1" position by the setting arm 693.

The mechanism for so releasing the secondary setting slides is best shown in FIGS. 14 and 15. A link 785 extends forwardly from the tail portion of the follower arm, being pivotally connected thereto by any suitable pivotal connection, such as pin 786. The forward end of the link 785, as shown in FIG. 15, is pivotally mounted on one leg 787 of a bail 788—the link being pivotally connected thereto by any suitable means, such as a pin 789. This leg 787 of the bail 788 is pivotally mounted on a stud 790 carried by the left-hand control plate 65. This stud 790 is aligned in the machine with the shaft 502 (FIG. 8) on which the back transfer control arm 501 is mounted. The right-hand end of the bail 788 is shown in FIG. 4, and is rigidly mounted on the left end of the shaft 502 just mentioned. This shaft 502 carries the releasing arm 835 shown in this figure and the operation of which has already been described. Thus, the rocking of the second cam follower arm 782, from the position shown in FIG. 21 to that of FIGS. 14 or 22, is effective to rock shaft 502, and hence arm 835, and thereby rocks the latching bail 830 to its releasing position. Thereupon the secondary setting slides 731 are allowed to move forwardly under the tension of their respective springs 734 until they assume their retracted, or normal, position with respect to the primary setting bars 730. Thereupon they register, through their arms 840, corresponding values in the coordinal selection bars 96 and 97.

It should also be noted in connected with FIG. 8, that the shaft 502 adjacent its right end carries an arm 795 which is rigidly mounted on the shaft. In its normal position this arm engages one arm of a rocker latch 796, the other arm of which engages the flange 833 of the locking bail 830. The rocker is biased into latching engagement with the bracket 833 by a suitable spring 797. Normally the parts lie in the position shown in FIG. 8, the rocker 796 blocking rotation of bail 830 to a slide-releasing position. However, the rocking of shaft 502 (counter-clockwise in FIG. 2 or clockwise in FIG. 8) rocks the rocker latch 796 (counter-clockwise in FIG. 8) to release latching bail 830 simultaneously with its rocking by the arms 835. By this means the locking bail 830 is locked against releasing movement throughout the back transfer operation and is enabled only in the last cycle of that operation, after all digitation has been completed.

It will be noted from the foregoing that the primary setting slides 730 will be detented in their adjusted position by their individual detents 745 (see FIG. 24), so that the value back transferred from the accumulator register will remain set in the selection mechanism until the operator positively operates the auxiliary slide releasing bail 521, or the bail is operated automatically by the "add" key mechanism. Such an operation can be secured by the initiation of a second back transfer operation or by merely operating the keyboard clear key 40, both of which are effective to rock the keyboard clearing bail 106 and hence cause translation of link 512 and releasing operation of the clear bail 521.

*8. Restoring Back Transfer Mechanism to Inoperative Position.*—The rocking of the second cam follower arm 782 by the lobe 671 of cam 670 is effective to restore the back transfer control shaft 572 to its normal, inoperative position and to release the dividend entry key 37 immediately before the end of the last cycle of operation. The cam follower 782 extends upwardly, as best shown in FIGS. 14 and 22, to a point behind a roller 575 mounted on the lower end of arm 574. When the shaft 572 is released, so that the arm 574 is pulled rearwardly to the position shown in FIGS. 21 and 22, the upper cam end 802 engages the roller 575. At the end of the operation the rocking of the cam follower arm 782 rocks the arm 574 (counter-clockwise in FIGS. 14 and 22) to return the arm from the position shown in FIG. 22 to that shown in FIG. 14. Such rocking of the shaft 572, upon which the arm 574 is pinned, or otherwise rigidly secured, is also effective to lift the latch arm 571 (FIG. 7) to enable it to be latched upon the shoulder 562 of the initiating slide 555.

The rocking of the cam follower arm 782 is also effective to release the dividend entry key at substantially the same time. As best shown in FIG. 14, a link 805 extends rearwardly from the follower arm, being pivotally connected thereto by a suitable pin 806. The rear end of the link 805 is provided with a slot 807 which embraces a pin 808 on an arm 809 pinned to the transverse shaft 612. This shaft extends entirely across the machine, as shown in FIG. 10. At its extreme right end it carries an arm 811 (see FIG. 6) rigidly secured thereto. A link 812 connects this arm to the rearwardly extending arm 813 of the bellcrank 470, the forward arm 469 of which carries the latching link 319 which holds the dividend entry key stem 315 in a depressed position. Thus immediately before the end of the final cycle of operation, the rocking of the cam follower arm 782 (FIG. 14) is effective to pull the latching link 319 (FIG. 6) rearwardly and release the key stem 315, so that the dividend entry key may be enabled to rise to its inoperative position. The rising of the dividend entry key terminates the machine operation, for it has been this key that has held the clutch engaged and the motor switch closed. It should also be noted that the depression of this key has also held the counter actuator disabled throughout the back transfer operation.

*9. Disabling Back Transfer from Preselected Orders (FIGS. 1, 5, 23 and 25).*—In back transfer operations it is often desirable to drop off, or omit, the transfer of values from certain orders of the product register dials 52. For example, in operations involving monetary values, it is often desirable to drop off fractional cents at the time of the back transfer operation, although one or both of the original factors may have involved fractional cents or fractional quantities. In many other types of computations, it is desired to carry an answer only to a predetermined number of decimal places and then "round-off" the lesser values. With our invention this is entirely practical. In this connection of "rounding-off" insignificant lesser values, it is assumed that the machine of the present invention will be provided with a fractional cent, or rounding-off, mechanism. A preferred type is that disclosed in the patent to Harold J. Chall, No. 2,660,377 of November 24, 1953, although other suitable mechanisms of this kind could be used. It is, therefore, a preferred form of our present invention to provide means whereby, from the setting of a simple indicator, a back transfer operation can be disabled in preselected orders of the keyboard.

The mechanism for this purpose is best shown in FIGS. 1, 5, 23 and 25. It comprises an indicating number, or slide, 860. Preferably this slide is provided with a curtain member 861 which is adapted to cover one of the windows 51, and thereby cover the dial 52—thus indicating to the operator that back transfers in that order, and all orders to the right thereof, are disabled. In our preferred form of invention, the slide member 860 is mounted on the decimal point marker rod 862, conventional in the machine. The slide has a tail portion 864 (FIG. 5) extending underneath the cover 50 of the carriage, as by extending through a slot 863 in the cover plate immediately in front of the decimal point marker rod 862. The slot extends from the first to the tenth orders thereof in order that it may be utilized to block transfers from any of the lowest ten orders of the register. The tail 864 carries a cam-shaped lower end 865, shown in profile in FIGS. 23 and 25. Preferably this cam-shaped portion of the tail is chamfered, or beveled, on both sides so that it is effective to operate as a cam in both directions.

Cooperating with the wedge-shaped cam extension 865, just described, is a series of T-shaped blocking members 870, preferably rotatably mounted on the rearward pins 712 which support the sensing slides 710 for longitudinal movement. As best shown in FIG. 25, the stem 871 of the T-member is provided with an ear 872 which, when the T-member is rocked to blocking position (to the dotted line position shown in FIG. 25) lies immediately adjacent the forward end 873 of the slot 711 which embraces the rearward pin 712. When the key member is in this position, rearward motion of the sensing slide 710 is impossible, so that upon operation of the back-transfer mechanism a back transfer in this order is disabled exactly the same as if the corresponding dial registered a "0." The two arms 874 of the T-member are provided with pins 875 at their extremities. These pins 875 are so located that the passage of the wedge-shaped cam tail 865 of the slides 860 is effective to rock the T-member to blocking position if the slide moves to the left across the T-member, or to unblocking position if the slide moves to the right. That is, one of the pins 875 will be cleared by the wedge-shaped cam 865 as it moves across the top of the T, but the other will always be engaged, thereby rocking the T-block 870. For example, referring to FIG. 25, if the wedge cam 865 is moved from the full-line position shown on the right of the figure to the dotted line position shown on the left, the cam 865 will clear the right-hand pin 875 but will engage the left-hand pin, thereby rocking the T-member 870 counter-clockwise to blocking position. The T-members 870 are mounted with a tight fit on the stems of the screws 712, so that friction holds a T-member in an adjusted position. Thus the passage of the slide 860 to the left from the position shown in FIG. 23, will first rock the T-shaped blocking member 870 of the first order of the register (counter-clockwise in this figure) to blocking position, and if moved further to the left, will similarly rock all of the similar T-shaped blocking members. All of these members will, therefore, block a transfer operation in those orders of the register. In the position shown in this figure, incidentally, all of the orders are freed for a back transfer operation.

III. RÉSUMÉ

It is believed that operation of the machine will be understood by the previous description. It has already been pointed out that the operation of the back transfer lever 500 rocks the keyboard clearing bail 106 (FIG. 8) to clear the keyboard and simultaneously clear the back transfer storage mechanism. It also releases a shaft 572 which: (1) depresses the dividend entry key and holds it depressed throughout the back transfer operation; (2) sets the dividend entry mechanism for a subtractive operation instead of the conventional additive; (3) disables the register clearing clutch and conditions the locking arm 613 (FIG. 21) for operation to latch the digitation control bar 135 in its subtractive position when the dividend entry mechanism is operated by the carriage reaching its predetermined ordinal position; and (4) conditions a counting mechanism for operation. When the latching arm 613 falls, it rocks the intermediate section of the compound mutilated gear assembly 639, so that its first tooth 655 is engaged by the long tooth of the drive gear, thereby initiating rotation of the gear assembly. This rotation proceeds through ten cycles. In the first cycle the cam follower arm 673 is rocked, thereby rocking the holding fingers 690 out of engagement with the sensing mechanisms and releasing them to sense the value in the coordinal register dials and, if sensing a value other than "0," to set the coordinal "1" to "5" selection slide 96 to a "1" value position. In the succeeding cycles a value of "1" will be subtracted from each order in which a value other than "0" stands, and as a dial returns to "0," its cam 720 will disable the sensing and setting mechanism. Thus, in the second cycle of operation all dials with the value of "1" will be returned to "0," in the third cycle all dials originally with the value of "2" will have been returned to "0," etc. In the tenth, and last, cycle of operation, after the ninth subtractive digitation has taken place, the cam 670 returns the cam follower arm 673 to its normal position in which it is held by the lobe of the cam, and immediately prior thereto will have (1) rocked the second cam follower arm 782 to release the latches which hold the secondary setting slides in their disabled position; (2) will have relatched the setting shaft 572; and (3) will have released the dividend entry key so that the operation comes to an end at the end of that cycle.

It will be understood that the machine shown and described herein is a preferred embodiment of our invention, and that the mechanisms shown are capable of considerable modification by a person skilled in the art without departing from the spirit or scope of this invention. It will be understood also, that although the present invention has been shown and described as embodied in a machine of the type disclosed in the Friden patents above-mentioned, this invention is not limited to incorporation in such a machine and may be applied to other commercial calculating machines on the market.

We claim:

1. In a cyclically operable calculating machine having ordinally arranged accumulator dials, an ordinally arranged and differentially settable selection mechanism, a digitation means operative to enter a value determined by the selection means into said accumulator dials, and means for connecting said accumulator dials to the digitation means settable for additive or subtractive operation, a back-transfer mechanism for selectively transferring a value standing in the accumulator register dials aligned with the selection mechanism into said selection mechanism comprising an ordinally arranged sensing mechanism associated with each order of the selection mechanism and operative to sense a "0" or non "0" condition of the coordinal accumulator dial, means operated by each sensing mechanism for setting the coordinal selection mechanism to register a value of "1," ordinally arranged setting members associated with each order of the selection means, means operated in each cycle of machine operation for adjusting said setting members a single value increment, means operated by said sensing mechanism for controlling the operation of said adjusting means, means for differentially setting the selection mechanism in accordance with the adjustment of the respective setting members, and a manually operated means for enabling operation of said back-transfer mechanism and setting said connecting means for subtractive operation.

2. In a calculating machine having ordinally arranged accumulator wheels, an ordinally arranged selection mechanism, a reversible differential drive means operative to enter a value determined by the selection means into said accumulator wheels additively or subtractively, and means for cyclically operating said differential drive means, a mechanism for selectively transferring a value standing in the accumulator register wheels aligned with the selection mechanism into said selection mechanism comprising an ordinally arranged sensing mechanism associated with each order of the selection mechanism and operative to sense a "0" or non "0" condition of the coordinal accumulator wheel, means operated by each sensing mechanism when sensing a non "0" condition for setting the coordinal selection mechanism to register a value of "1," ordinally arranged setting members associated with each order of the selection means, means operated by said cyclically operating means for adjusting said setting members a single value increment in each cycle of operation, means operated by said sensing mechanism when sensing a "0" condition to disable the operation of the coordinal adjusting means, means for terminating operation of said machine after a predetermined number of subtractive cycles of operation, means operated at the termination of operation for differentially setting the various selection mechanisms in accordance with the adjustment of the coordinal setting member, and a manually operated means for enabling said sensing means and said adjusting means, setting said reversible drive means for subtractive operation, and initiating operation of said cyclically operable means.

3. In a calculating machine having ordinally arranged accumulator wheels, an ordinally arranged selection mechanism, a reversible differential drive means operative to enter a value determined by the selection means into said accumulator wheels additively or subtractively, and means for cyclically operating said differential drive means, a mechanism for selectively transferring a value standing in the accumulator register wheels aligned with the selection mechanism into said selection mechanism comprising means for setting said reversible drive means for subtractive operation, an ordinally arranged sensing mechanism associated with each order of the selection mechanism and operative to sense a "0" or non "0" condition of the coordinal accumulator wheel, means operated by each sensing mechanism when sensing a non "0" condition for setting the coordinal selection mechanism to register a value of "1," ordinally arranged setting members associated with each order of the selection means, means operated by said cyclically operating means for adjusting said setting means a single value increment in each cycle of operation, means operated by said sensing mechanism when sensing a "0" condition to disable the operation of the coordinal adjusting means, means for differentially setting the various selection mechanisms in accordance with the adjusted position of the coordinal setting member, a manually operated means for enabling said sensing means and said adjusting means and initiating operation of said cyclically operable means, and a manually operated means for disabling the sensing means in preselected orders.

4. In combination with a cyclically operable calculating machine having ordinarily arranged register wheels, a plurality of ordinally arranged selection means, a digitation means for entering a value determined by said selection means into said register wheels additively or subtractively, an ordinally arranged storage member associated with each order of the selection mechanism, and drive means for operating said digitation mechanism, a means for transferring a value standing in the register wheels aligned with said selection mechanism into said selection mechanism which comprises a manually operated member, means operated by said member for initiating operation of said drive means and for setting said digitation means for subtractive operation, a sensing means aligned with each order of the selection mechanism operative to sense the "0" or non "0" condition of the coordinal register wheel, a value setting mechanism operated by said sensing mechanism when sensing a non "0" condition of the coordinal register wheel to set a value of "1" in the coordinal selection means, means for adjusting said storage members an increment equivalent to a value of "1" with each cycle of machine operation, means operated by said sensing mechanisms for connecting said adjusting means to said drive means so long as the sensing means senses a non "0" condition in the coordinal wheel, a normally inoperative interponent member resiliently positioned by the coordinal storage member and operative to set the coordinal selection mechanism to the value position determined by said storage member, and an operation terminating means operable after nine subtractive cycles of operation to disable the sensing means, to stop said drive means, and release said normally latched resilient means and thereby set the various selection mechanisms to the values determined by the coordinal storage member.

5. The apparatus of claim 4 comprising also a manually operated mechanism for disabling the sensing means in preselected orders.

6. In a cyclically operable calculating machine having ordinally arranged register wheels, an ordinally arranged selection mechanism, a digitation means for entering into said register wheels additively or subtractively values determined by the coordinal selection mechanism, and a cyclically operable drive means, a mechanism for setting a value accumulated in said register wheels into the coordinal selection mechanism comprising a cam on each of said register wheels having a single lobe corresponding to the value of "0" and extending through an angle correponding to the "0" position of the register wheel, a sensing means in each order operable to sense the "0" or non "0" position of said cam, a value setting means in each order operated by said sensing means and operative to set the coordinal selection means to a value of "1," ordinally arranged adjustable value storage members adjustable a single value increment in each cycle of machine operation, means controlled by said sensing means for connecting a storage member to said drive means when sensing a value other than "0" and disconnecting the same therefrom when sensing a value of "0," an interponent member between each storage member and the coordinal selection mechanism and operable to set a digital value into said coordinal selection mechanism, a resilient means for positioning said interponent member to a position corresponding to the value position of the coordinal storage member, normally operative means for blocking operation of said interponent means, a manually operated control key, means operated by said control key for initiating operation of said driving means, for setting said digitation means for subtractive operation, for operating said sensing means, and for continuously cycling said machine through nine digitation cycles, and means operated by termination of operation of said machine for disabling said blocking means and thereby enabling operation of said interponents.

No references cited.

UNITED STATES PATENT OFFICE
CERTIFICATE OF CORRECTION

Patent No. 3,032,263                          May 1, 1962

Elwood A. Davis et al.

It is hereby certified that error appears in the above numbered patent requiring correction and that the said Letters Patent should read as corrected below.

Column 10, line 62, for "ac onventional" read -- a conventional --; column 12, line 6, after "machine" strike out the comma; column 13, line 71, for "direction" read -- directions --; column 15, line 52, after "bellcrank" insert -- 326 --; column 16, line 40, for "255" read -- 355 -- column 21, line 24, for "Then" read -- When --; column 29, line 11, after "settable" insert a comma; column 32, line 50, after "figures" insert a comma; line 61, for "glide" read -- slide --; column 33, line 46, for "regster" read -- register --; line 55, for "rturned" read -- returned --; line 58, for "42" read -- 24 --; column 35, lines 19, 30 and 33, for "626", each occurrence, read -- 526 --; line 52, for "750" read -- 740 --; column 38, line 71, for "connected" read -- connection --.

Signed and sealed this 2nd day of April 1963.

(SEAL)
Attest:

ESTON G. JOHNSON                        DAVID L. LADD

Attesting Officer                        Commissioner of Patent